(12) United States Patent
Saarinen

(10) Patent No.: US 12,229,323 B2
(45) Date of Patent: Feb. 18, 2025

(54) CO-PROCESSOR FOR CRYPTOGRAPHIC OPERATIONS

(71) Applicant: PQShield Ltd, Oxford (GB)

(72) Inventor: Markku-Juhani Olavi Saarinen, Oxford (GB)

(73) Assignee: PQShield Ltd., Oxford (GB)

( * ) Notice: Subject to any disclaimer, the term of this patent is extended or adjusted under 35 U.S.C. 154(b) by 357 days.

(21) Appl. No.: 17/672,440

(22) Filed: Feb. 15, 2022

(65) Prior Publication Data

US 2022/0171885 A1 Jun. 2, 2022

Related U.S. Application Data

(63) Continuation of application No. PCT/GB2020/051874, filed on Aug. 6, 2020.

(30) Foreign Application Priority Data

| Aug. 16, 2019 | (GB) | 1911802 |
| Feb. 25, 2020 | (GB) | 2002655 |

(51) Int. Cl.
*G06F 21/72* (2013.01)
*G06F 9/30* (2018.01)
(Continued)

(52) U.S. Cl.
CPC .......... *G06F 21/72* (2013.01); *G06F 9/30101* (2013.01); *G06F 21/554* (2013.01); *G06F 21/556* (2013.01); *G06F 21/602* (2013.01)

(58) Field of Classification Search
CPC ...... G06F 21/72; G06F 21/554; G06F 21/556; G06F 21/602; G06F 9/30101
See application file for complete search history.

(56) References Cited

U.S. PATENT DOCUMENTS

| 3,911,330 | A | 10/1975 | Fletcher et al. |
| 4,589,120 | A | 5/1986 | Mendala |
| (Continued) | | | |

FOREIGN PATENT DOCUMENTS

| CN | 103812643 A | 5/2014 |
| EP | 801477 A1 | 10/1997 |
| (Continued) | | |

OTHER PUBLICATIONS

"Blitter Hardware" of the AMIGA Hardware Reference Manual. Addison-Wesley. 1985, Chapter 6.
(Continued)

*Primary Examiner* — Hee K Song
(74) *Attorney, Agent, or Firm* — EIP US LLP

(57) ABSTRACT

Certain examples described herein relate to a co-processor that allows a processing unit to efficiently perform a cryptographic operation. The co-processor has an arithmetic unit that is configured to perform discrete binary arithmetic using bit sequences loaded from a memory. The co-processor may be configured for fast, low-power computation of certain functions that comprise low-level building blocks for the cryptographic operation. These functions may include Boolean logic and integer arithmetic. The co-processor has a set of control registers that are writable by the processing unit to control the co-processor. Addresses for one or more sources and destinations may be computed by the co-processor to allow for flexible operation. The co-processor may allow many advanced cryptographic operations to be rapidly computed, including those that are "post-quantum" secure.

20 Claims, 7 Drawing Sheets

(51) Int. Cl.
    *G06F 21/55*     (2013.01)
    *G06F 21/60*     (2013.01)

(56) References Cited

U.S. PATENT DOCUMENTS

| | | | |
|---|---|---|---|
| 6,407,766 | B1 | 6/2002 | Ramanujan et al. |
| 8,194,855 | B2 | 6/2012 | Shantz et al. |
| 8,538,012 | B2 | 9/2013 | Dixon et al. |
| 8,572,410 | B1 | 10/2013 | Tkacik et al. |
| 8,971,538 | B1 | 3/2015 | Marr et al. |
| 9,772,845 | B2 | 9/2017 | Yap et al. |
| 10,038,550 | B2 | 7/2018 | Gopal et al. |
| 10,313,129 | B2 | 6/2019 | Gopal et al. |
| 2002/0040429 | A1 | 4/2002 | Dowling |
| 2003/0084309 | A1* | 5/2003 | Kohn ............... G06F 21/72 712/E9.067 |
| 2008/0019524 | A1 | 1/2008 | Kim et al. |
| 2008/0056488 | A1 | 6/2008 | Motoyama |
| 2008/0229116 | A1 | 9/2008 | Dixon et al. |
| 2008/0298583 | A1 | 12/2008 | Ahmed |
| 2009/0254718 | A1 | 10/2009 | Biscondi et al. |
| 2010/0115237 | A1 | 5/2010 | Brewer et al. |
| 2010/0128872 | A1 | 5/2010 | Cordery et al. |
| 2010/0146296 | A1 | 6/2010 | Kim et al. |
| 2010/0195820 | A1 | 8/2010 | Frank |
| 2010/0235417 | A1 | 9/2010 | Baek |
| 2010/0289943 | A1 | 11/2010 | Tokoro et al. |
| 2012/0076293 | A1 | 3/2012 | Smith et al. |
| 2013/0275722 | A1 | 10/2013 | Yap et al. |
| 2014/0095844 | A1 | 4/2014 | Gopal et al. |
| 2014/0189369 | A1 | 7/2014 | Woolrich et al. |
| 2014/0254792 | A1 | 9/2014 | Gammel |
| 2015/0149788 | A1 | 5/2015 | Gupta et al. |
| 2016/0080143 | A1 | 3/2016 | Kindarji et al. |
| 2017/0018013 | A1 | 1/2017 | Faust et al. |
| 2017/0109162 | A1 | 4/2017 | Yap et al. |
| 2017/0142081 | A1 | 5/2017 | Jutla |
| 2017/0180131 | A1 | 6/2017 | Ghosh et al. |
| 2017/0242590 | A1 | 8/2017 | Gokhale et al. |
| 2018/0063100 | A1* | 3/2018 | Peeters ............... G06F 21/74 |
| 2018/0157489 | A1 | 6/2018 | Yap et al. |
| 2018/0212761 | A1 | 7/2018 | Bilgin et al. |
| 2019/0109703 | A1* | 4/2019 | Gueron ............... G06F 9/30007 |
| 2019/0146700 | A1 | 5/2019 | Gschwind et al. |

FOREIGN PATENT DOCUMENTS

| | | | |
|---|---|---|---|
| EP | 955590 | A1 | 11/1999 |
| EP | 992887 | A2 | 4/2000 |
| EP | 1068565 | A2 | 1/2001 |
| JP | H03251890 | A | 11/1991 |
| JP | H0697930 | A | 4/1994 |
| JP | 20010195555 | A | 7/2001 |
| JP | 2002107691 | A | 4/2002 |
| JP | 20050532604 | A | 10/2005 |
| JP | 2008233683 | A | 10/2008 |
| JP | 2014197169 | A | 10/2014 |
| JP | 2015014962 | A | 1/2015 |
| JP | H10-31530 | A | 2/2019 |
| JP | 20190511791 | A | 4/2019 |
| KR | 1020190020988 | A | 3/2019 |
| WO | 0176129 | A2 | 10/2001 |
| WO | 03/021863 | A1 | 3/2003 |
| WO | 2011123575 | A1 | 10/2011 |
| WO | 2014/136594 | A1 | 9/2014 |
| WO | 2019158641 | A1 | 8/2019 |

OTHER PUBLICATIONS

""Crypto-processeur"", pp. 1-190 URL: https://tel.archives-ouvertes.fr/tel-00978472/document sections 3 and 4, 2012.
[CC-PP-0084] "Security IC Platform Protection Profile with Augmentation Packages." Bundesamt für Sicherheit in der Informationstechnik (BSI) reference BSI-CC-PP-0084-2014.https://www.commoncriteriaportal.org/files/ppfiles/pp0084b_pdf.pdf Jan. 13, 2014.
[SOGIS-AVA] "Application of Attack Potential to Smartcards and Similar Devices." Version 3.1. (2020). https://www.sogis.eu/documents/cc/domains/sc/JIL-Application-of-Attack-Potential-to-Smartcards-v3-1.pdf Jun. 2020.
[SP800-193] "Platform Firmware Resiliency Guidelines." NIST SP 800-193. (2018). DOI: https://doi.org/10.6028/NIST.SP.800-193 May 2018.
[RFC8391] "XMSS: extended Merkle Signature Scheme." IETF RFC 8391 (2018). DOI: https://doi.org/10.17487/RFC8391 May 2018.
[RFC8554] "Leighton-Micali Hash-Based Signatures." IETF RFC 8554 (2018). DOI: https://doi.org/10.17487/RFC8554, Apr. 2018.
[FIPS202] "SHA-3 Standard: Permutation-Based Hash and Extendable-Output Functions." FIPS Pub 202. (2015). DOI: https://doi.org/10.6028/NIST.FIPS.202 Aug. 2015.
[PQFAQ] ""Post-Quantum Cryptography FAQs / Transition and Migration."" https://csrc.nist.gov/projects/post-quantum-cryptography/faqs Jan. 3, 2017.
[CoGrVa14] J. Coron, J. Großschädl, P. K. Vadnala. ""Secure Conversion Between Boolean and Arithmetic Masking of Any Order."" IACR-CHES (2014). http://www.crypto-uni.lu/jscoron/publications/secconvorder.pdf Sep. 23, 2014.
[Co17] J. Coron. "High-Order Conversion From Boolean to Arithmetic Masking." IACR-CHES (2017). https://eprint.iacr.org/2017/252 Sep. 25, 2017.
[GaGrMa+20] S. Gao, J. Großschädl, B. Marshall, D. Page, T. Pham, and F. Regazzoni."An Instruction Set Extension o Support Software-Based Masking." (2020) https://eprint.iacr.org/2020/773 Jun. 23, 2020.
[BeDaPe+10] G. Bertoni, J. Daemen, M. Peeters, and G. Van Assche. ""Building power analysis resistant Implementations of Keccak."" SHA-3 Conference (2010) https://keccak.team/files/KeccakDPA.pdf Aug. 2010.
[NiRiSc11] S. Nikova, V. Rijmen, and M. Schlaffer. ""Secure Hardware Implementation of Nonlinear Functions in the Presence of Glitches."" J. Cryptol. 24, pp. 292-322 (2011). https://doi.org/10.1007/s00145-010-9085-7 Oct. 19, 2010.
[Sa18] M.-J. O. Saarinen. "Arithmetic Coding and Blinding Countermeasures for Lattice Signatures." J. Cryptogr. Eng. (2018) 8:71-84. http://rdcu.be/oHun https://eprint.iacr.org/2016/276 Jan. 21, 2017.
[BaBeEs+18] G. Barthe, S. Belaïd, T. Espitau, P.-A. Fouque, B. Grégoire, M. Rossi, and M. Tibouchi. "Masking the GLP Lattice-Based Signature Scheme at Any Order." IACR-EUROCRYPT (2018) https://eprint.iacr.org/2018/381 Apr. 26, 2018.
[BeAnKa+20] M. Van Beirendonck, J. D'Anvers, A. Karmakar, J. Balasch, and I. Verbauwhede."A Side-Channel Resistant Implementation of SABER." To appear in ACM JETC (2020). https://eprint.iacr.org/2020/733 Jun. 17, 2020.
[BoGoRe+21] J. Bos, M. Gourjon, J. Renes, T. Schneider, and C. van Vredendaal. "Masking Kyber: First- and Higher-Order Implementations." To appear (2021). https://eprint.iacr.org/2021/483 Apr. 15, 2021.
[FrVaRo+21] T. Fritzmann, M. Van Beirendonck, D. Basu Roy, P. Karl, T. Schamberger, I. Verbauwhede, and G. Sigl. "Masked Accelerators and Instruction Set Extensions for Post-Quantum Cryptography." Preprint (2021). https://eprint.iacr.org/2021/479 Apr. 15, 2021.
[MiGeTi+19] V. Migliore, B. Gérard, M. Tibouchi, and P. Fouque. "Masking Dilithium: Efficient Implementation and Side-Channel Evaluation." ACNS (2019). https://eprint.iacr.org/2019/394 Apr. 14, 2019.
[RV-ISA] RISC-V International. "RISC-V Specifications." RISC-V International (2021). https://riscv.org/technical/specifications/.
[RV-CRYPTO] RISC-V International (Ben Marshall, Ed.) "RISC-V Cryptography Extension." RISC-V CETG (2021). https://github.com/riscv/riscv-crypto Feb. 19, 2020.
[RV-ZKT] RISC-V International (M.-J. Saarinen, Ed.) "ZKT Constant Time Instruction List." RISC-V CETG (2021). https://github.com/rvkrypto/riscv-zkt-list Apr. 9, 2021.

(56) References Cited

OTHER PUBLICATIONS

[RV-VECTOR] "Working draft of the proposed RISC-V V vector extension." RISC-V (2021). https://github.com/riscv/fiscv-v-spec Jun. 13, 2019.
[SP 800-185] "SHA-3 Derived Functions: cSHAKE, KMAC, TupleHash, and ParallelHash"National Institute of Standards and Technology (NIST), Dec. 2016 https://doi.org/10.6028/NIST.SP. 800-185 John Kelsey, Shu-Jen Chang, Ray Perlner.
[NIST PQC] "Post-Quantum Cryptography: Round 2 Submissions" Jan. 3, 2017 https://csrc.nist.gov/Projects/Post-Quantum-Cryptography/Round-2-Submissions.
[NIST LWC] "Lightweight Cryptography: Round 1 Candidates" created Jan. 3, 2017 https://csrc.nist.gov/Projects/Lightweight-Cryptography/Round-1-Candidates.
[ASCON] Christoph Dobraunig, Maria Eichlseder, Florian Mendel and Martin Schlaffer, ""Asconv1.2."" Proposal to NIST LWC standardization effort, Mar. 2019. https://ascon.iaik.tugraz.at/files/asconv12-nist.pdf https://ascon.iaik.tugraz.at/.
[FARFALLE] Guido Bertoni, Joan Daemen, Seth Hoffert, Michaël Peeters, Gilles Van Assche, and Ronny Van Keer, "Farfalle: parallel permutation-based cryptography." IACR Cryptology ePrintArchive: Report 2016/1188, Dec. 2016. https://eprint.iacr.org/2016/1188.
[Kangaroo] Guido Bertoni, Joan Daemen, Michael Peeters, Gilles Van Assche, Ronny Van Keer, and Benoît Viguier, "KangarooTwelve: fast hashing based on Keccak-p." Proc. ACNS 2018, LNCS 10892, pp. 400-418, Springer, 2018. https://doi.org/10.1007/978-3-319-93387-0_21https://keccak.team/files/KangarooTwelve.pdf.
[KEYAK] Guido Bertoni, Joan Daemen, Seth Hoffert, Michaël Peeters, Gilles Van Assche, andRonny Van Keer, "CAESAR submission: Keyak v2." Keccak Team, Sep. 2016.https://keccak.team/keyak.html https://keccak.team/files/Keyakv2-doc2.2.pdf.
[RISCV] Andrew Waterman and Krste Asanović (Eds.), "The RISC-V Instruction Set Manual(vols. 1 and 2)." RISC-V Foundation, Jun. 2019. https://riscv.org/specifications/.
[SNEIK] Markku-Juhani O. Saarinen, "SNEIKEN and SNEIKHA: The SNEIK Family ofLightweight Cryptographic Algorithms." Proposal to NIST LWC standardization effort, Mar. 2019. https://github.com/pqshield/sneik.
Hayo Baan, Sauvik Bhattacharya, Scott Fluhrer, Oscar Garcia-Morchon, ThijsLaarhoven, Ronald Rietman, Markku-Juhani O. Saarinen, Ludo Tolhuizen, and Zhenfei Zhang. Round5: Compact and fast post-quantum public-keyencryption. In PQCrypto 2019—volumeThe Tenth International Conference on Post-Quantum Cryptography. Chongqing, China, May 8-10, 2019, volume to appearof Lecture Notes in Computer Science. Springer, 2019. URL: https://eprint.acr.org/2019/090.
Daniel J. Bernstein. Chacha, a variant of salsa20, 2008. URL: https://cr.yp.to/chacha/chacha-20080128.pdf. Jan. 28, 2008.
Joppe W. Bos, Simon Friedberger, Marco Martinoli, Elisabeth Oswald, andMartijn Stam. Fly, you fool! faster frodo for the ARM cortex-m4. IACRCryptology ePrint Archive, 2018:1116, 2018. URL: https://eprint.iacr.org/2018/1116. Nov. 16, 2018.
Daniel J. Bernstein et al : A cross-platformpermutation. In Wieland Fischer and Naofumi Homma, editors, Crypto-graphic Hardware and Embedded Systems—CHES 2017—19th InternationalConference, Taipei, Taiwan, Sep. 25-28, 2017, Proceedings, vol. 10529 of Lecture Notes in Computer Science, pp. 299-320. Springer, 2017. doi:10.1007/978-3-319-66787-4\_15. Sep. 25, 2017.
Ray Beaulieu, Douglas Shors, Jason Smith, Stefan Treatman-Clark, BryanWeeks, and Louis Wingers. The SIMON and SPECK families of lightweightblock ciphers. IACR Cryptology ePrint Archive, 2013:404, 2013. URL: https://eprint.acr.org/2013/404. Jun. 19, 2013.
Christoph Dobraunig, Maria Eichlseder, Florian Mendel, and Martin Schläffer.Ascon v1.2. Submission to the CAESAR Competition, 2016. URL: https://competitions.cr.yp.to/round3/asconv12.pdf. Sep. 15, 2016.
Joan Daemen, Seth Hoffert, Gilles Van Assche, and Ronny Van Keer. Thedesign of xoodoo and xoofff. IACR Trans. Symmetric Cryptol., 2018(4): 1-38, 2018. URL: https://doi.org/10.13154/tosc.v2018.i4.1-38, doi: 10.13154/tosc.v2018.i4.1-38. Dec. 13, 2018.

Peter Gazi et al. The exact PRF securityof truncation: Tight bounds for keyed sponges and truncated CBC. In Rosario Gennaro and Matthew Robshaw, editors, Advances in Cryptology—CRYPTO2015—35th Annual Cryptology Conference, Santa Barbara, CA, USA, Aug. 16-20, 2015, Proceedings, Part I, vol. 9215 of Lecture Notes in ComputerScience, pp. 368-387. Springer, 2015. doi:10.1007/978-3-662-47989-6\_18. Aug. 16, 2015.
Mike Hamburg. The STROBE protocol framework. IACR Cryptology ePrintArchive, 2017:3, 2017. URL: http://eprint.acr.org/2017/003. Jan. 3, 2017.
Philipp Jovanovic et al. Beyond 2 c/2 security insponge-based authenticated encryption modes. In Palash Sarkar and Tetsulwata, editors, Advances in Cryptology—ASIACRYPT 2014—20th International Conference on the Theory and Application of Cryptology and Informa-tion Security, Kaoshiung, Taiwan, R.O.C., Dec. 7-11, 2014. Proceedings, Part I, vol. 8873 of Lecture Notes in Computer Science, pp. 85-104.Springer, 2014. doi:10.1007/978-3-662-45611-8\ 5.
Dmitry Khovratovich and Ivica Nikolic. Rotational cryptanalysis of ARX. InSeokhie Hong and Tetsu Iwata, editors, Fast Software Encryption, 17th In-ternational Workshop, FSE 2010, Seoul, Korea, Feb. 7-10, 2010, RevisedSelected Papers, vol. 6147 of Lecture Notes in Computer Science, pp. 333-346. Springer, 2010. URL: https://doi.org/10.1007/978-3-642-13858-4_19, doi:10.1007/978-3-642-13858-4\_19.
Kathleen M. Moriarty, Burt Kaliski, Jakob Jonsson, and Andreas Rusch.PKCS #1: RSA cryptography specifications version 2.2. RFC, 8017:1-78,2016. doi:10.17487/RFC8017. Nov. 2016.
Bart Mennink, Reza Reyhanitabar, and Damian Vizár. Security of full-statekeyed sponge and duplex: Applications to authenticated encryption. In Tetsulwata and Jung Hee Cheon, editors, Advances in Cryptology—ASIACRYPT2015—21st International Conference on the Theory and Application of Cryptol-ogy and Information Security, Auckland, New Zealand, Nov. 29-Dec. 3, 2015, Proceedings, Part II, vol. 9453 of Lecture Notes in ComputerScience, pp. 465-489. Springer, 2015. doi:10.1007/978-3-662-48800-3\_19.
B. Poettering. Avraes: The aes block cipher on avr controllers, 2007. URL:http://point-at-infinity.org/avraes/. Mar. 11, 2007.
Markku-Juhani O. Saarinen. Beyond modes: Building a secure record protocolfrom a cryptographic sponge permutation. In Benaloh [Ben14], pp. 270-285.doi:10.1007/978-3-319-04852-9\_14. Feb. 25, 2014.
Markku-Juhani O. Saarinen. CBEAM: efficient authenticated encryption fromfeebly one-way ¢ functions. In Benaloh [Ben14], pp. 251-269. doi:10.1007/978-3-319-04852-9\_13. Nov. 21, 2013.
Markku-Juhani O. Saarinen and Billy Bob Brumley. Whirlbob, the whirlpoolbased variant of STRIBOB. In Sonja Buchegger and Mads Dam, editors, Se-cure IT Systems, 20th Nordic Conference, NordSec 2015, Stockholm, Sweden, Oct. 19-21, 2015, Proceedings, vol. 9417 of Lecture Notes in ComputerScience, pp. 106-122. Springer, 2015. doi: 10.1007/978-3-319-26502-51_8.
Peter Schwabe and Ko Stoffelen. All the AES you need on cortex-m3 and M4. In Roberto Avanzi and Howard M. Heys, editors, Selected Areas in Cryptog-raphy—SAC 2016—23rd International Conference, St. John's, NL, Canada, Aug. 10-12, 2016, Revised Selected Papers, vol. 10532 of Lecture Notes inComputer Science, pp. 180-194. Springer, 2016. URL: https://doi.org/10.1007/978-3-319-69453-5_10, doi:10.1007/978-3-319-69453-5\_10.
Ascon Lightweight Authenticated Encryption and Hashing, Jan. 2, 2019.
David J. Wheeler and Roger M. Needham. Correction to xtea. InformalManuscript or Report, 1998. URL: https://www.mjos.fi/doc/misc/xxtea.pdf. Oct. 1998.
International Search Report and Written Opinion dated Nov. 7, 2022 for PCT Application No. PCT/GB2022/051829.
Liang , W. and Long Jing: "A cryptographic algorithm based on Linear Feedback Shift Register." 2010 International Conference on Computer Application and System Modeling (ICCASM 2010). vol. 15. IEEE, 2010. (Year: 2010).
Japanese Office Action dated Jul. 1, 2024 for Japanese Patent Application No. 2022-503796.

(56) References Cited

OTHER PUBLICATIONS

Japanese Notice of Allowance dated Dec. 2, 2024 for Japanese Patent Application No. 2022-510211.

* cited by examiner

| Register name | Number | Offset | Description |
| --- | --- | --- | --- |
| CRBL_R_OPER | 0 | 00 | Function specifier / engage. |
| CRBL_R_STAT | 1 | 04 | Status readout (not zero = busy). |
| CRBL_R_SIZX | 2 | 08 | X size (width). |
| CRBL_R_SIZY | 3 | 0C | Y size (height). |
| CRBL_A_ADDR | 4 | 10 | A source: Start address. |
| CRBL_A_INCX | 5 | 14 | A source: X step increment. |
| CRBL_A_INCY | 6 | 18 | A source: Y step increment. |
| CRBL_A_CSRL | 7 | 1C | A source: Control and shift. |
| CRBL_B_ADDR | 8 | 20 | B source: Start address. |
| CRBL_B_INCX | 9 | 24 | B source: X step increment. |
| CRBL_B_INCY | 10 | 28 | B source: Y step increment. |
| CRBL_B_CSRL | 11 | 2C | B source: Control and shift. |
| CRBL_C_ADDR | 12 | 30 | C source: Start address. |
| CRBL_C_INCX | 13 | 34 | C source: X step increment. |
| CRBL_C_INCY | 14 | 38 | C source: Y step increment. |
| CRBL_C_CSRL | 15 | 3C | C source: Control and shift. |
| CRBL_D_ADDR | 16 | 40 | Destination: Start address. |
| CRBL_D_INCX | 17 | 44 | Destination: X step increment. |
| CRBL_D_INCY | 18 | 48 | Destination: Y step increment. |
| CRBL_CUSTOM | 19 | 4C | *Reserved for future use.* |

*Fig. 8*

CO-PROCESSOR FOR CRYPTOGRAPHIC OPERATIONS

CROSS-REFERENCE TO RELATED APPLICATIONS

This application is a continuation of International Application No. PCT/GB2020/051874, filed Aug. 6, 2020, which claims priority to GB Application No. GB1911802.5, filed Aug. 16, 2019, and GB Application No. GB2002655.5, filed Feb. 25, 2020, under 35 U.S.C. § 119(a). Each of the above-referenced patent applications is incorporated by reference in its entirety.

BACKGROUND

Technical Field

The present invention relates to cryptographic hardware, in particular, a co-processor for performing cryptographic operations. The co-processor may be used as part of a cryptographic system on chip. Methods of performing a cryptographic operation are also described.

Background

Recently, there has been an explosion in the number of devices that are connected to computer networks. For example, Internet connectivity is expanding beyond computing devices such as desktop and laptop computers to embedded systems within everyday objects such as motor vehicles, lightbulbs, fridges, medical devices, thermostats and surveillance systems. Telecommunications links allow many low-cost computing devices to report sensor data, and/or be controlled, across the world. One issue with these connected devices is that they are often vulnerable to attack and malicious control. For example, hundreds or thousands of embedded devices may be compromised by malicious parties and used to enact distributed denial of services attacks. In many cases, control of these devices is easily obtained due to poor or limited implementations of cryptographic protocols. As these connected devices grow in number and popularity, there is an open question as to how to secure them.

Another consideration when securing connected computing devices is the possibility of a future attack using quantum computing. For many years, quantum computers were of mainly theoretical interest. However, research implementations of quantum computers are developing rapidly. Quantum computers having 50 and 72 qubits are currently available, and there are many research groups actively working on higher qubit machines. Given the possible future reality of quantum computing, recent work has shown that many well-known public key cryptographic systems can be broken by a sufficiently strong quantum computer.

When implementing cryptographic functions, especially those that are "post quantum" secure, there is the challenge that many of these functions are resource intensive. For example, many cryptographic functions involve complex mathematical functions using values with long bit lengths. These typically consume a large number of processor cycles and present difficulties for implementations within low-resource embedded devices. Additionally, as end-to-end encryption of both data and communications becomes common, these cryptographic functions also have to be performed repeatedly at high speeds. To be secure is to be slow.

US 2008/0019524 A1 describes an apparatus for a low power AES cryptographic circuit for an embedded system. The apparatus includes: an interface circuit for inputting and outputting data and a control command in cooperation with a general purpose processor; a code processing unit for performing a round operation in an operation order of an add round key operation, a sub-byte key operation, a shift row operation, and a mix column operation; a data memory for storing data input through the interface circuit and operation results processed at the code processing unit; a data selecting unit for selecting data input/output to and from the code processing unit and a storing unit; and a control unit for controlling the code processing unit, the storing unit, and the data selecting unit such that a round operation of a set round is repeatedly performed on data input from the interface circuit, and an add round key operation is performed on a shift row-operated result value and a secret key during a last round.

It is desirable to provide efficient implementations of cryptographic operations. For example, it is desired to provide implementations that may be used within low-resource embedded systems and/or in high-speed data processing operations, while offering resistance to attack in a post-quantum environment.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which:

FIG. 8 is a table showing an example set of control registers;

DETAILED DESCRIPTION

Certain examples described herein relate to a co-processor that allows a processing unit to efficiently perform a cryptographic operation. The co-processor has an arithmetic unit that is configured to perform discrete binary arithmetic using bit sequences loaded from a memory. These bit-sequences may be blocks of bits and so the co-processor may be referred to as a form of "blitter", i.e. a hardware-assisted system for movement and manipulation of blocks of bits in memory (where the term "blitter" comes from the "BitBLT"—bit block transfer—microcode instruction of the Xerox Alto computer). The co-processor may be configured for fast, low-power computation of certain functions that comprise low-level building blocks for the cryptographic operation. These functions may include Boolean logic and/or integer arithmetic. As such, the processing unit may effectively off-load resource intensive computations for the cryptographic operation to the co-processor, which operates as a dedicated and secure hardware device. The co-processor may provide low-level bit operations that are atomic from the viewpoint of the processing unit. The co-processor may thus allow many advanced cryptographic operations to be rapidly computed, including those that are "post-quantum" secure.

In certain examples described herein, the co-processor may be used in a wide variety of computing systems, from Internet servers to embedded devices. In one implementation, the co-processor may be provided as part of a wider cryptographic system-on-chip (SoC) that may allow for many low-cost embedded devices to implement "post-quantum" cryptography and provide "post-quantum" secure systems. For example, the functions implemented by the arithmetic engine of the co-processor may allow code or lattice-based cryptographic operations to be rapidly performed, e.g. by off-loading many common low-level binary logic functions such as integer addition, subtraction and multiplication. The co-processor may be configured or pre-programmed with a set of available functions that may be selected by the processing unit via a function flag or variable in the control register of the co-processor. The co-processor may be able to more rapidly compute certain functions by avoiding the need to load and interpret distinct instructions as required by the processing unit. For example, the set of available functions may be hard configured in programmable micro-circuitry and configured to access data in an arrangement of source and destination registers, wherein data is fetched and stored based on memory addresses that are generated for each iteration of the arithmetic engine by an address generator. The cryptographic processor may be particularly beneficial when used with embedded and resource-limited targets.

Figure 1:
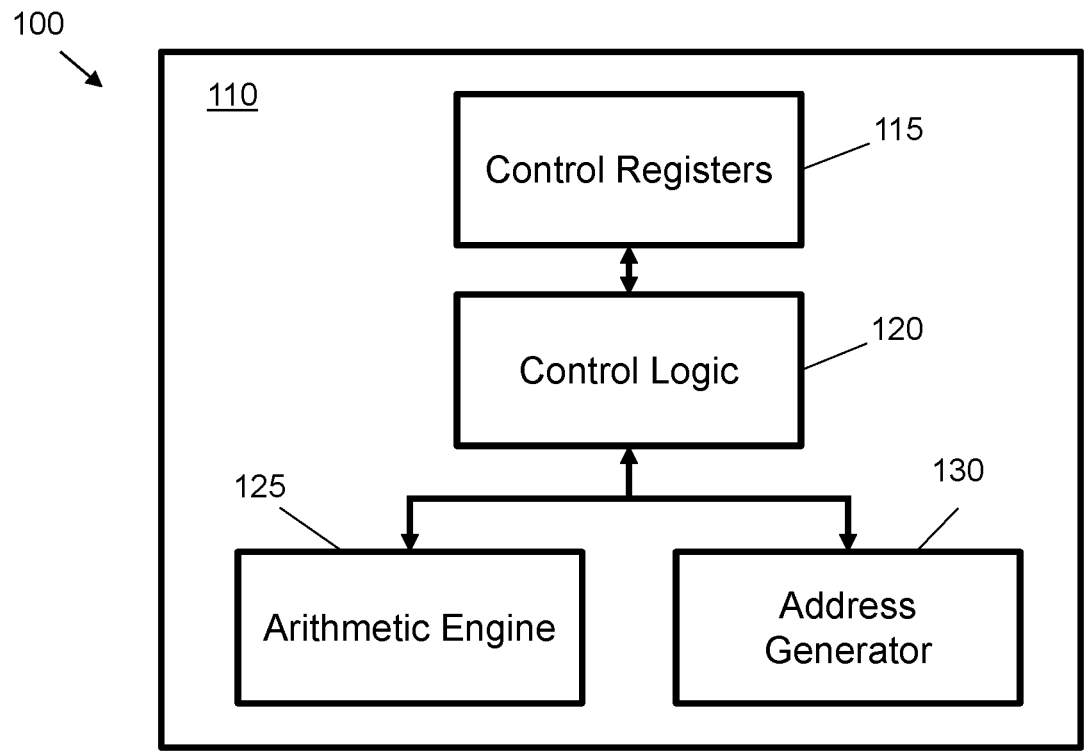
FIG. 1 is a schematic illustration showing a co-processor for cryptographic operations according to an example.

FIG. 1 shows an example 100 of a cryptographic co-processor 110. In FIG. 1, the cryptographic co-processor 110 comprises a set of control registers 115, control logic 120, an arithmetic engine 125 and an address generator 130. The cryptographic co-processor 110 may be implemented using a programmed Field Programmable Gate Array (FPGA) or an Application Specific Integrated Circuit (ASIC). The components of the cryptographic co-processor 110 may be configured using a hardware description language (HDL). In certain cases, different components of the cryptographic co-processor 110 may be implemented using one or more of dedicated logic circuitry, ASICs, FPGAs and firmware instructions. In one case, the functionality of the cryptographic co-processor 110 may be provided via one or more of a microcode and firmware update. In this case, authentication of the microcode may be required to ensure security.

Figure 2:
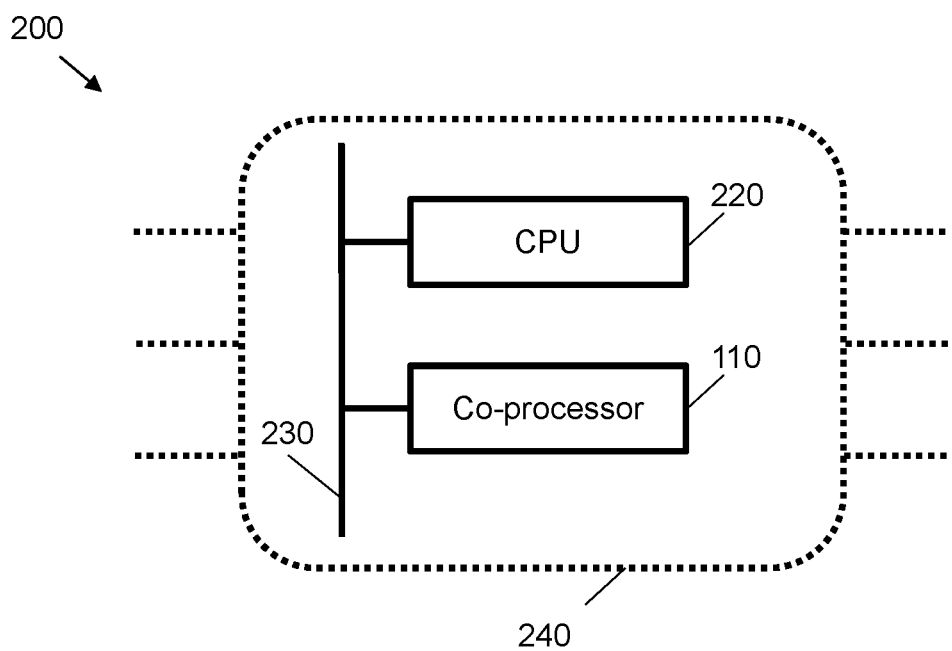
FIG. 2 is a schematic illustration showing a cryptographic system-on-chip according to an example.

The cryptographic co-processor 110 is designed for use with an external or main processing unit. This is shown in the example 200 of FIG. 2, wherein the cryptographic co-processor 110 is communicatively coupled to a central processing unit (CPU) 220 via a systems bus 230. The systems bus 230 may comprise one or more of a data bus and an address bus. The example 200 of FIG. 2 shows the cryptographic co-processor 110 and the central processing unit 220 forming part of a cryptographic system-on-chip 240. This may be embedded into a range of devices, from smart cards to server boards. Alternatively, the cryptographic co-processor 110 may form part of a motherboard for a computing device, such as a server, laptop, tablet or smartphone. The CPU may comprise a microprocessor having one or more processing cores. The CPU may comprise a Reduced Instruction Set Computer (RISC) processor, such as a RISC-V processor.

In an example, one or more of the cryptographic co-processor 110 and the cryptographic system-on-chip 240 may be provided (e.g. packaged) as a discrete unit. For example, the discrete unit may be a self-contained security microcontroller (e.g. supplied as a smart card, a Universal Serial Bus—USB-device and/or a Radio Frequency Identification—RFID-device), an auxiliary cryptographic module or accelerator, a cryptographic Trusted Platform Module (TPM) or a Hardware Security Module (HSM). In certain examples, the cryptographic co-processor 110 and the CPU 220 may be co-located on a circuit board. Hence, one or more of the cryptographic co-processor 110 and the cryptographic system-on-chip 240 may be provided as a single chip that is easily added to a further computing board for a wide variety of computing devices.

Returning to FIG. 1, the control registers 115 are accessible to the external processing unit (e.g. CPU 220). The external processing unit is able to write data to the control registers 115 to control the operation of the cryptographic co-processor 110. The control registers 115 may be memory mapped such that they appear as addressable portions of memory to the external processing unit. Alternatively, they may form part of named Single Instruction, Multiple Data (SIMD) or vector register set of the external processing unit. In a RISC Instruction Set Architecture (ISA), such as RISC-V, the control registers 115 may be implemented as one or more Control and Status Registers (CSRs) and/or one or more vector extensions, e.g. in the latter case, a control register may be viewed as one or more vector registers. The set of control registers may be used for exchanging data and control information between the cryptographic co-processor 110 and the external processing unit. The control registers 115 may be used to store one or more of: status (e.g. busy or awaiting instruction), a function to perform, sizes for source and/or destination data, memory locations for source and/or destination data, shift parameters, increment parameters for one or more of address and data arrays, and/or indicators to show whether a current function is complete. The external processing unit may be configured to read a value stored within the control registers 115 to determine whether an output of a function is available, may receive an interrupt from the cryptographic co-processor and/or may wait a predetermined number of clock cycles associated with a function. Different approaches may be used depending on implementation requirements.

In the example of FIG. 1, the control logic 120 reads values written to the control registers 115 by the external processing unit and controls the operation of the arithmetic engine 125 and the address generator 130 based on those values. One of the set of control registers 115 may be configured to store an indication of a function that is to be performed using the arithmetic engine 125. The function may be selected from a set of available functions, where the set of available functions may be pre-configured (e.g. pre-programmed into, or configured within, an ASIC or FPGA). The set of available functions are configured to manipulate one or more bit sequences read from a data source (hereafter referred to as a "source") and to store a result of the manipulation as destination data (hereafter referred to as a "destination"). For example, the set of available functions may include specific integer arithmetic functions that are used frequently by post-quantum cryptographic methods, such as lattice or code-based cryptographic methods. Integer arithmetic functions may include multiplication, addition and subtraction operations that are performed on one or more bit sequences that are deemed to be representative of integer values (e.g. 8, 16 or 32-bit integers). Where Boolean operations are performed the bit sequences may be representative of integer values but may be treated as a sequence of independent bits (e.g. for bit logic). Different bit length values may be supported. The arithmetic engine 125 may be controlled by the control logic 120 to perform the function indicated in the control registers 115. The indicated function may be performed upon binary data stored within a set (e.g. a plurality) of source registers and an output of the function may be stored in at least one destination register. The set of source registers may be seen as the above "sources" for the function and the at least one destination register may be seen as the above defined "destination" for an output of the function. The source and destination registers may form part of the arithmetic engine 125 and/or may comprise particular locations within an internal memory of the cryptographic co-processor 110.

In one case, the control logic 120 may comprise one or more additional registers that may be used to store values read from the set of control registers. For example, if the set of control registers 115 are memory mapped to an address space of an external processing unit, then a secondary set of control registers may be used to speed up operations. This secondary set of control registers may not be accessible to the external processing unit; instead being used internally by the cryptographic co-processor 110. In this case, one or more values in the set of control registers 115 may be copied to the secondary set of control registers when a new operation is started. This may avoid needing to re-initialize the set of control registers 115 for each operation. The secondary set of control registers may be used to store a set of "running addresses". For example, if an operation is copying a small block of data to multiple destination addresses, then only the destination address parameters need updating and an operation may be started individually for each updated set of destination address parameters.

In practice, the control logic 120 may include (systems) bus control and chip select logic, as well as signalling to reset the cryptographic co-processor 110. In certain implementations, it may also comprise logic to generate one or more interrupts for the external processing unit. One function of the control registers 115 and the control logic 120 may be to provide an interface between internal logic of the cryptographic co-processor 110 and the main systems bus and external processing unit.

Figure 3:
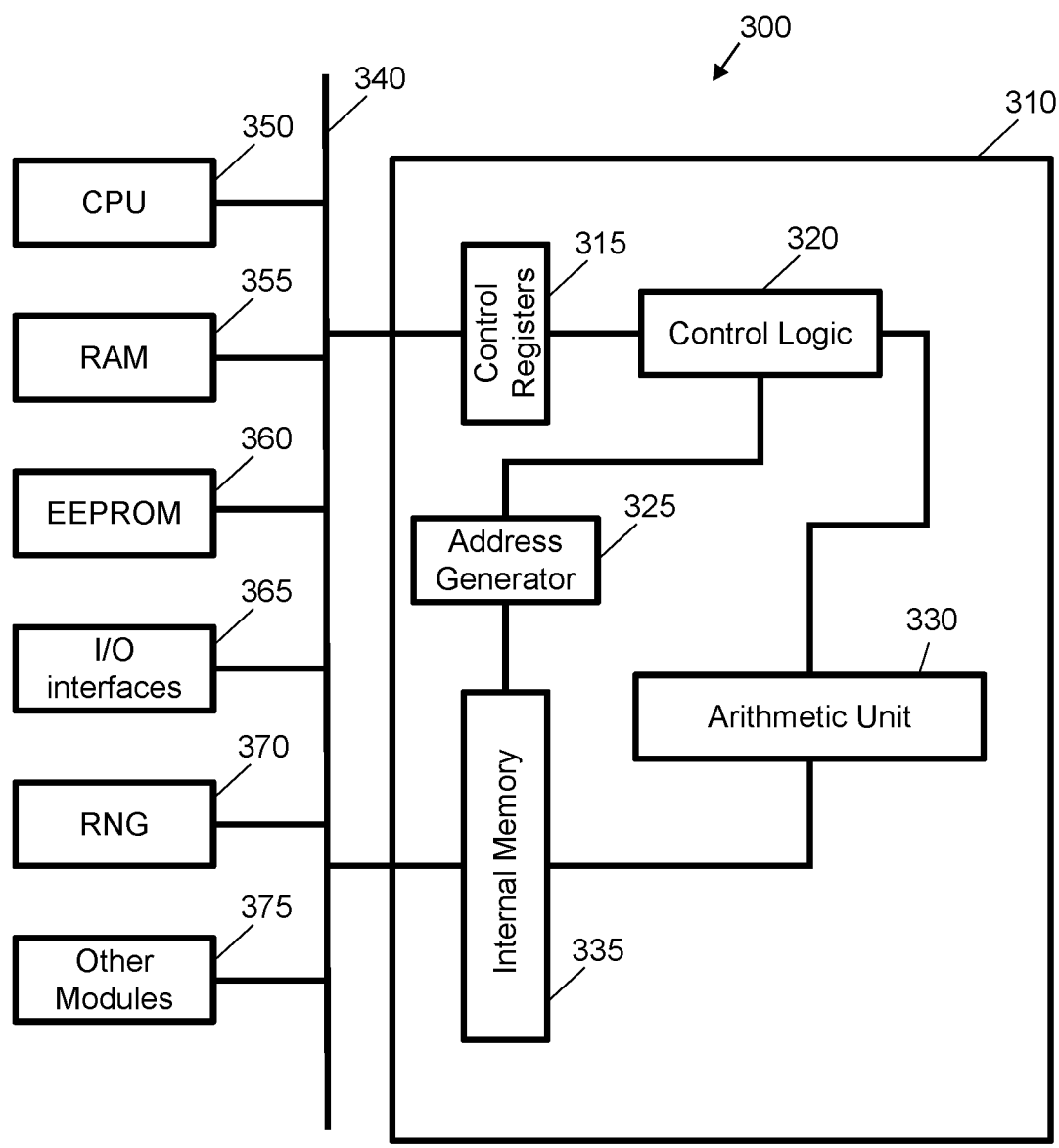
FIG. 3 is a schematic illustration showing a co-processor for cryptographic operations coupled to a systems bus within a computing device according to an example.

The address generator 130 is adapted to determine a set of source addresses that are used to load binary data from memory into the set of source registers and at least one destination address that is used to store binary data from the at least one destination register in memory. The memory may comprise an internal memory of the cryptographic co-processor 110 or a communicatively coupled external memory. The address generator 130 may determine the source and destination addresses based on values stored in the control registers 115. These values may comprise a start address and parameters that indicate how to navigate through the memory. In one example, which is explained in more detail later below, the cryptographic co-processor 110 may be configured to operate upon a multi-dimensional representation of data within the memory, and to save a result of the function as a similar multi-dimensional representation within the memory. For example, a sequence of memory locations starting from a start address may be considered as a flattened matrix of a height and a width as defined by values within the control registers 115. In one case, if the arithmetic engine 125 applies a function that does not act on all available sources, then source addresses may only be determined for a subset of the available sources. For example, the address generator 130 may comprise independent logic for each available source, and in this case, only logic that is associated with a set of used sources may be activated to determine a set of source addresses, FIG. 3 shows a further example of a computing device 300 that uses a cryptographic co-processor 310. The computing device 300 may form a standalone computing device or may comprise a system-on-chip implementation as shown in FIG. 2. The cryptographic co-processor 310 is configured in a similar manner to the example 100 of FIG. 1. The cryptographic co-processor 310 comprises a set of control registers 315, control logic 320, an address generator 325 and an arithmetic unit 330. In the example 300 of FIG. 3, it also comprises an internal memory 335. Both the control registers 315 and the internal memory 335 are coupled to a systems bus 340 for the computing device 300. FIG. 3 is provided as an example only and it should be noted that different implementations may comprise different components or combinations of components than those shown.

As well as the cryptographic co-processor 310, the computing device 300 also comprises a CPU 350, random access memory (RAM) 355, an electrically erasable programmable read only memory (EEPROM) 360, one or more input/output interfaces 365, a random number generator 370, and possible other cryptographic modules 375. The CPU 350 may comprise a RISC processor. The EEPROM 360 may be implemented as any programmable memory and may be configured to store operating computer program code for the computing device 300, e.g. may comprise flash memory that stores firmware for an embedded device or system-on-chip. The RAM 355 may comprise a primary memory for the CPU 350. The one or more input/output interfaces 365 may comprise, amongst others, network and communication interfaces and peripheral interfaces. The random number generator 370 and the other cryptographic modules 375 may respectively comprise specific micro-circuitry to generate true random numbers and perform defined cryptographic algorithms (e.g. SHA-3, AES etc). These may be implemented in a similar manner to the cryptographic co-processor 310, e.g. as a specific chip, programmed FPGA or ASIC. The components of the computing device 300 may exchange data via the systems bus 340 and/or wired electrical couplings.

In the example 300 of FIG. 3, the control registers 315 and the internal memory 335 of the cryptographic co-processor 310 are accessible to the CPU 350. For example, the control registers 315 and the internal memory 335 may be configured as a memory mapped resource for the CPU 350. In this case, the CPU 350 may read and write data to the control registers 315 and the internal memory 335 in a similar manner to RAM 355 and/or EEPROM 360. In one case, the set of control registers 315 and the internal memory 335 may be mapped to a secure address space of the CPU 350, e.g. an address space that is not accessible to non-root, non-administrative or user processes. This may help to secure the operation of the cryptographic co-processor 310. Although the set of control registers 315 and the internal memory 335 are shown as separate components in FIG. 3, they may be implemented by a common set of memory that is accessible to the CPU 350 (e.g. be implemented as different ranges of addresses within the memory).

The cryptographic co-processor 310 may additionally be protected using security fuses and/or side-channel attack countermeasures. Security fuses may prevent unauthorised access to memory of the cryptographic co-processor 310 that stores operating firmware, microcode and the like. For example, the control circuitry, sensitive arithmetic operations, and other components may be protected with logical or physical countermeasures that prevent or mask leakage of secret information via electromagnetic emissions, fluctuations in power user, operation timing, or other unintended side channels. In one case, a physically secured enclosure (for the co-processor) and/or guarding logic can be used to detect unacceptable or malicious variations in operating conditions such as input voltage or signals. The circuitry may also use error detection and correction to ensure the detection and correction of faults. Upon detection of such an error condition, a further operation may be prevented via a security fuse mechanism. The co-processor may also be configured to immediately erase any secret information contained within internal memory, such as private keys.

In the example 300 of FIG. 3, the address generator 325 is configured to determine a plurality of source addresses and a destination address within the internal memory 335 for a given iteration of the arithmetic engine 330. The internal memory 335 may be filled with data to be used to perform a defined number of iterations of the function to be performed by the arithmetic engine 330, and the address generator 325 may determine a different set of source and destination addresses for each iteration. The arithmetic engine 330 may be configured to read or fetch data from the plurality of source addresses as determined by the address generator 325 prior to computation of the function. The arithmetic engine 330 may then store a result of the computation to the destination address. In certain cases, the arithmetic engine 330 may read data from, and write data to, a set of temporary registers or cache that may store the data as part of a memory transfer. The CPU 350 may be able to read the result of the computation by accessing the destination address in the internal memory 335 or may wait until a number of iterations have been completed and read data from a plurality of destination addresses, e.g. a defined block of the internal memory 335.

Figure 4:
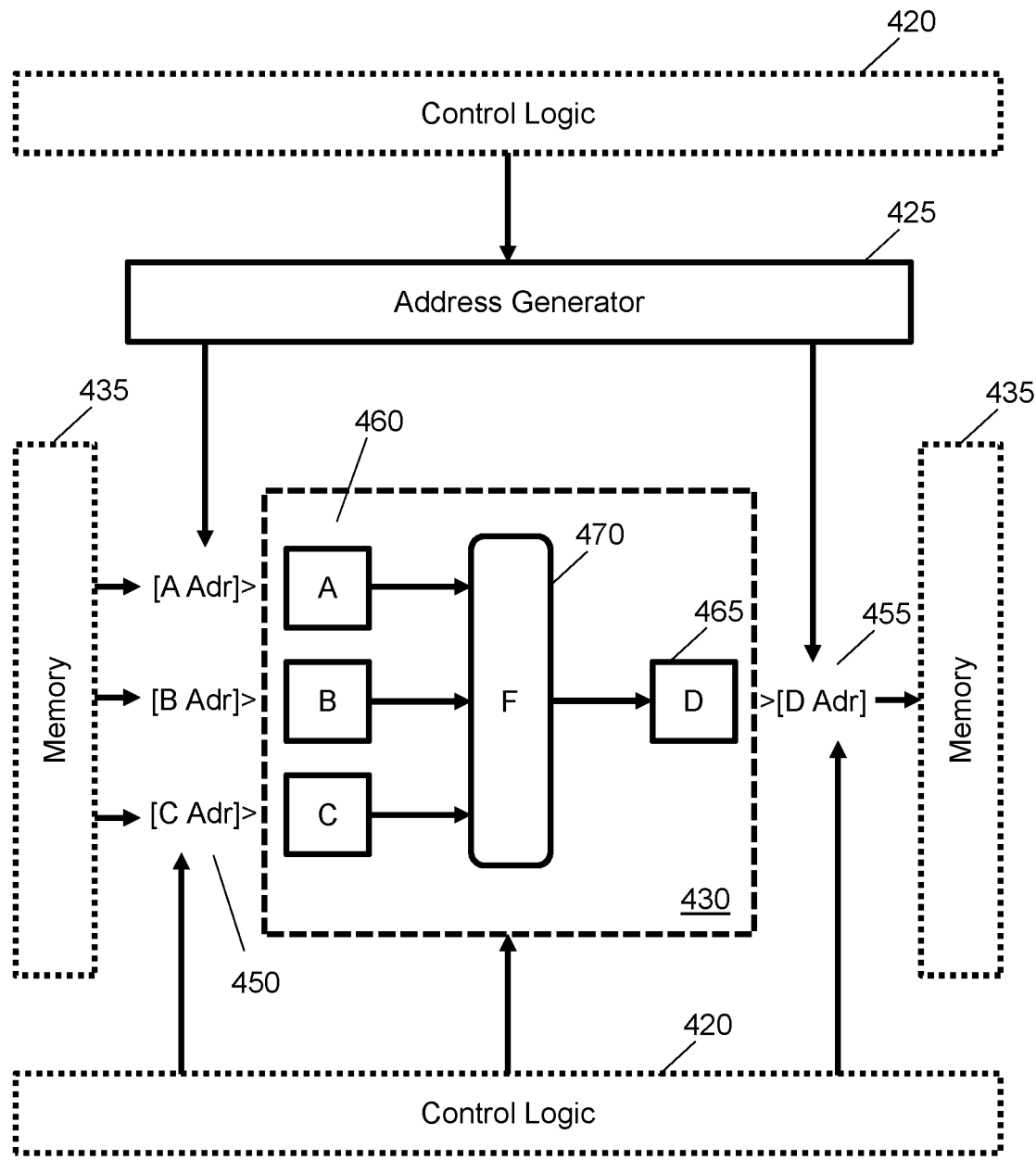
FIG. 4 is a schematic illustration showing the operation of an arithmetic engine according to an example.

FIG. 4 shows an example 400 of how an arithmetic engine may process data as indicated by an address generator. FIG. 4 shows portions of control logic 420 that control an address generator 425 and an arithmetic unit 430. Although two portions are shown for clarity, these may form part of a single portion of control logic or circuitry. In this example, the arithmetic unit 430 processes bit sequences that are read from memory 435 using memory addresses 450 determined by the address generator 425, and outputs a resultant bit sequence that is stored in memory using memory address 455, which is also determined by the address generator 425. In this example, the arithmetic unit 430 comprises three source registers 460 and one destination register 465. These are shown as internal registers of the arithmetic unit 430 but may alternatively comprise a pipeline cache of the cryptographic co-processor. Each function in the set of available functions is configured (e.g. as a programmed HDL function) to read data from the three source registers 460, perform a set of computations, and then output the result to the destination register 465. Data is loaded into the three source registers 460 from a set of three memory locations as indicated by the memory addresses 450.

The co-processor may use a word-based addressing system, in which case the memory addresses 450 may comprise addresses for words of w bits. The word size w may be selected to match a word size of the external processing unit or may be selected independently of the word size of the external processing unit. For example, w may comprise 32 or 64 bits. If the word size of the cryptographic co-processor is greater than that of the external processing unit, this may help to increase bandwidth. This may be desirable in embedded use cases where the external processing unit may be limited to 32-bit, but the cryptographic co-processor may be configured as having a word length of 64 bits. In general, the external system bus, one or more internal buses used by the co-processor and the set of control, source and/or destination registers may be of different bit widths. This can allow the cryptographic co-processor to use faster internal memory.

The memory addresses 450 may allow three sequences of w bits corresponding to each of the sources A, B, and C to be loaded into the three source registers 460. Similarly, the memory address 455 may indicate a location in memory 435 to store an output word of w bits. As per previous examples, the memory 435 may comprise an internal memory of the cryptographic co-processor, such as internal memory 335 in FIG. 3, or an external memory, such as RAM 355 in FIG. 3. An internal memory may be preferred to free up the systems bus 340 and/or the RAM 355 for use by the CPU 350 while the cryptographic co-processor 310 is computing a function. In FIG. 4, a function may be defined as $D=f_i(A, B, C)$ where $f_i$ is one of k selectable functions. The function to be used—i—may be indicated by a bit sequence written to a function identification register within the set of control registers, where the bit sequence represents a function number. In a higher-level programming language interface, e.g. for use in computer program code executed by the external processing unit, the function identification values may be set as a list or array of predefined constants.

In the example 400 of FIG. 4, the control logic 420 may be configured to apply the address generator 425 and the arithmetic engine 430 over a set of iterations. On each iteration, the address generator 425 may recompute the memory addresses 450 and 455. As such, on each iteration, the data loaded into the three source registers 460 may change (although depending on the address generation parameters written to the control registers it may also stay the same for one or more sources). The destination memory address 455 may also change on each iteration. It should be noted that with certain path navigation parameters, the generated memory addresses may also repeat or overlap, e.g. to allow repetitions or overwriting of data as required by a particular operation.

Figure 5A:
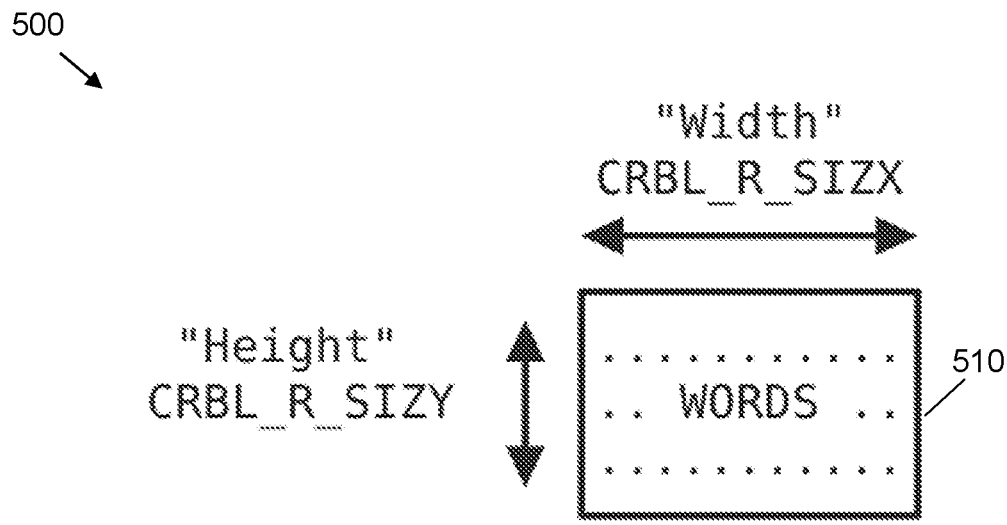
FIG. 5A is a schematic illustration showing a multi-dimensional data array according to an example.

By performing a number of iterations, the arithmetic engine 430 may be configured to apply a selected function to a multi-dimensional array of data associated with each of the three sources (A, B and C) and to output a multi-dimensional array associated with the destination (D). Such a multi-dimensional array is shown schematically in FIG. 5A. In the example of FIG. 5A, the cryptographic co-processor may be considered to operate on a multi-dimensional array in the form of a matrix 510 (i.e. two-dimensional array) of data for each of plurality of sources. The multi-dimensional array may be stored in memory 435 as a flattened sequence of words yet represented as a multi-dimensional data structure by iterating within a series of nested loops. For example, FIG. 5A shows how a two-dimensional block of words may have a width and a height (as measured by a number of words in a first- or X-dimension and a number of words in a second- or Y-dimension). The size of each of the dimensions of the multi-dimensional array may be set by values stored in a plurality of control registers, e.g. a first control register (CRBL_R_SIZX) may store a bit sequence representing an integer size in words in the first dimension (width) and a second control register (CRBL_R_SIZY) may store a bit sequence representing an integer size in words in the second dimension (height). It is preferred that the set of sources and the destination have the same size multi-dimensional array as this reduces the number of control parameters that are required to be set and simplifies the logic to allow for fast implementation on custom circuitry. However, in other implementations different ones of the sources and destination may have different sized arrays. The size of each of the dimensions may be set as an integer value of 1 or more.

Data may be retrieved from a defined multi-dimensional array by iterating over a sequence of words stored in memory using a set of nested loops, the number of nested loops being equal to the number of dimensions of the multi-dimensional array. For example, two nested loops may be used to iterate over a sequence of words in memory that are processed as a two-dimensional matrix. In one example, the address generator determines source and destination addresses that represent a programmable path within the respective multi-dimensional arrays of data based on values stored within the set of control registers. These values may indicate a start address, e.g. of a first word in memory, and increments for each of the dimensions. The increments may be positive or negative, allowing a wide variety of custom paths through the multi-dimensional array. The increments may be applied when iterating over the data. For example, an increment in the X direction may be applied during each iteration, e.g. as a row is read, and an increment in the Y direction may be applied after a set of iterations, e.g. at the end of a row.

As an example, consider the sequence "ABCDEFGHIJKLMNOP", where each letter represents a word stored in memory. If the size parameters (e.g. CRBL_R_SIZX and CRBL_R_SIZY) are both 4, then a matrix is considered that has 4 rows of length 4. If an increment is 1 in the X direction and 0 in the Y direction, then, during the iterations, a row is read one word at a time—e.g. A, B, C, D. At the end of the row, the Y increment is applied. If it is set as 0, then nothing happens at the end of the row and subsequent iterations start reading a next row linearly from where the previous row iteration ended, e.g. D, E, F, G. This may continue such that the data is read as "ABCDDEFGGHLIJKLM", repeating every fourth word and ignoring the last three words. If there is an increment of 1 in both X and Y directions (e.g. respectively shown as the width and height in FIG. 5A) then this may allow iteration along a row of words (e.g. taking words in sequence across the width—A, B, C, D) before moving to a next row (e.g. after the first 4 words are read and a row is complete, the Y increment advances by 1 again, so the next row starts at E—E, F, G, H). In this case, "ABCDEFGHIJKLMNOP" is read. By configuring the size, and the increments, then a programmable path through the data may be determined. For example, setting the X increment as 4 and the Y increment as −11 would read the sequence: "AEIMBFJNCG-KODHLP", i.e. read along the columns and effectively determining the transpose of an original matrix of data having a width and height of 4 words.

A set of iterations by the cryptographic co-processor may form part of an atomic operation from the point of view of the external processing unit. For example, they may be instructed with a single instruction of the external processing unit. The set of iterations may be used to perform a single cryptographic operation upon a plurality of sources, where those sources have an associated multi-dimensional array of data. This operation may be referred to as a "blit" (e.g. of the co-processor as a "blitter"). The set of iterations may be synchronised to the clock cycle of the external processing unit, e.g. the complete set may be performed in one clock cycle of the external processing unit. This may allow a considerable speed increase as the same cryptographic operation as performed on the external processing unit may require a plurality of fetch, decode and execute cycles on both data and address memory, while the cryptographic co-processor may allow the result to be available in accessible memory following a much shorter time period. In this manner, each atomic operation of the cryptographic co-processor may affect, at most, a set of words that make up a multi-dimensional array, i.e. the destination may comprise a multidimensional array the same size as the sources. In certain examples, the clock rate of cryptographic co-processor may be different to that of the external processing unit. In these cases, either the cryptographic co-processor or the external processing unit may execute individual steps in a single cycle or more cycles. The number of steps that are performed may depend on memory bandwidth, and in case of the external processing unit, the complexity of the instruction.

Figure 5B:
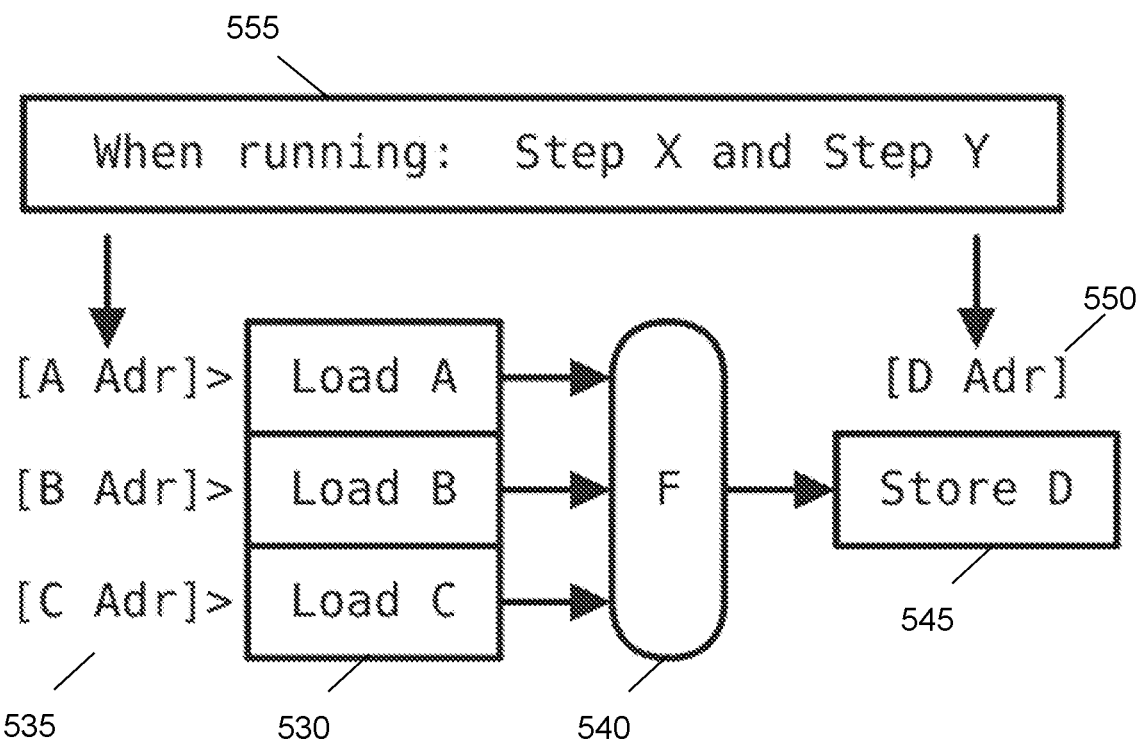
FIG. 5B is a schematic illustration showing how an arithmetic unit may be iteratively applied to a set of multi-dimensional data arrays according to an example.

FIG. 5B shows an example 520 where each of three sources (A, B, C) and a destination (D) have independent address generation logic but where each are represented as two-dimensional matrices as shown in FIG. 5A. In this case, each matrix shares the same width and height parameters. Navigation over each matrix is then determine by a start address, and X and Y increment parameters (e.g. for both the sources and destination).

The operation in FIG. 5B is similar to that shown in FIG. 4. Blocks 530 show words for each of the sources A, B and C being loaded from memory addresses 535 that are determined by address generation logic for each source. The address generation logic may form part of the address generator 425 in FIG. 4. It may comprise a fixed circuit within an FPGA or ASIC (e.g. as programmed or configured). A function is applied at block 540 and then an output word is stored at destination D, as indicated by a destination address 550 that is computed by the address generation logic for the destination. In FIG. 5B, block 555 shows how the address generation logic for the sources and the destination may use external loop counters that generate "Step X" and "Step Y" signals based on the values for the X and Y increment parameters. Hence, on each iteration new data may be loaded at blocks 530 based on the X and Y increment parameters for the sources, and likewise stored at a different destination address in a similar manner. The X and Y step increments may be retrieved from control registers CRBL_z_INCX and CRBL_z_INCY, where z may be one of A, B, C and D. The values stored in these control registers may be arbitrary and signed to provide a highly flexible set of programmable paths. If both are set to 1, then a linear, continuous block of CRBL_R_SIZX by CRBL_R_SIZY words is processed. The increments may also be set as functions of a constant or another control register value. For example, if CRBL_z_INCX=1 and CRBL_z_INCY=−CRBL_R_SIZX+1, then the same "row" of CRBL_R_SIZX words is read CRBL_R_SIZY times. This can allow many different cryptographic computations to be performed with a common hard-programmed function and different programmable paths. For example, to replicate reads for one or more of the sources A, B and C in FIG. 5A, a negative Y increment may be set. In the examples of FIGS. 5A and 5B, address generation may be performed by the address generator of previous examples by performing the following pseudocode operation simultaneously with address generation logic for each of z={A, B, C, D}:

```
Initialize all Z = CRBL_z_ADDR
For i = 1 to CRBL_R_SIZY do:
    For j = 1 to CRBL_R_SIZX do:
        Set [D] = F( [A], [B], [C] )
        If (j != CRBL_R_SIZX) then
            Z = Z + CRBL_z_INCX
        Else
            Z = Z + CRBL_z_INCY
    End For
End For
```

Performing the address generation for each of the sources and the destination in parallel increases the speed of the co-processor as compared to the external processing unit. As lattice cryptography is largely based on linear algebra and matrices, then the flexibility of a programmable path through the data may allow for large matrix multiplications and other large algebraic structures to be efficiently computed. Functions and operations may thus relate to one or more of: matrix multiplication and addition, polynomial ring multiplication and addition; big integer multiplication and addition; and finite field multiplication and addition (amongst others).

The co-processor described herein may also implement a form of shift control in certain implementations. In these implementations, the co-processor may provide a mechanism for custom shifts of data that are loaded into the source registers, e.g. of the data that is read from the source addresses computed by the address generator of previous examples. Shift control may allow data of a set word size, w-bits, to be shifted by a configurable number of bits, s. This shift may occur before the function is applied by the arithmetic engine of previous examples, and thus provide a further powerful avenue for function customisation without requiring a change to the base function itself. It allows the cryptographic co-processor of the described examples to read and combine data in a way that is not aligned to w-bit word boundaries. In certain cases, shifts may additionally, or alternatively, be applied to the data associated with the destination. For example, it may be desired to shift data in a destination register prior to storage at a destination memory address to perform rounding of values stored as a binary sequence.

Figure 6:
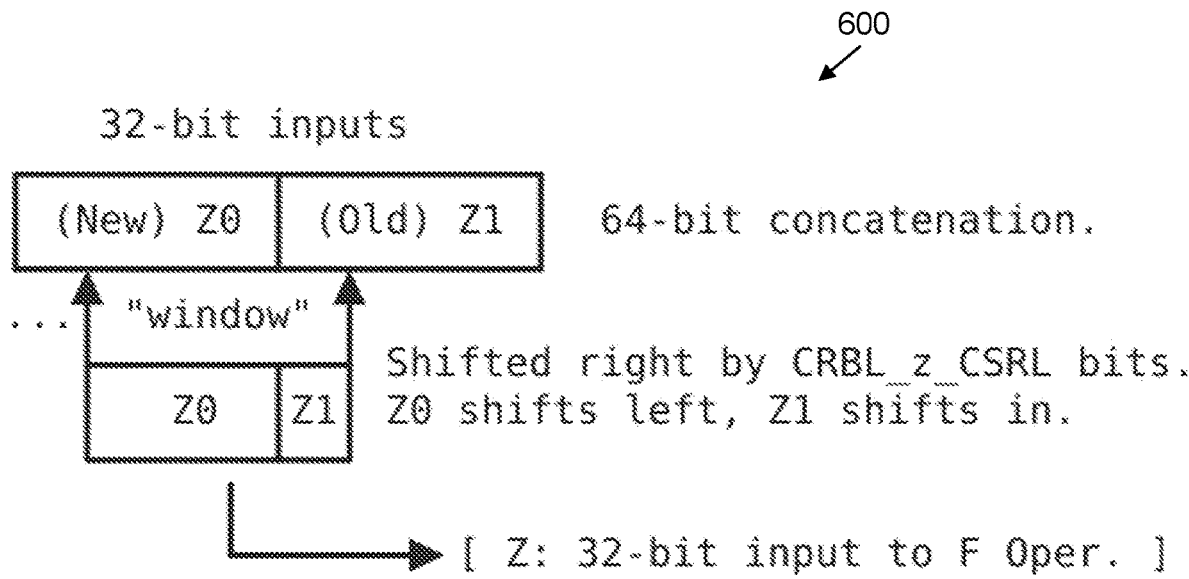
FIG. 6 is a schematic illustration showing how source data may be shifted on input according to an example.

FIG. 6 shows an example where the source and destination registers store 32-bit words. This may be a word size of the external processing unit. To implement shift control, a plurality of shadow registers corresponding to the plurality of source registers are provided. For example, if the source registers comprise registers A0, B0 and C0 (e.g. similar to those shown in FIG. 4), then a set of shadow registers may be provided comprising registers A1, B1, and C1, e.g. the shadow registers being a copy or clone of the source registers. In this case, responsive to an instruction to copy data from the plurality of source addresses to respective ones of the plurality of source registers, the co-processor may be configured to store the previous values of the plurality of source registers in the plurality of shadow registers (i.e. A1=A0, B1=B0, and C1=C0).

FIG. 6 shows how custom shift control may be implemented when using shadow registers described above. FIG. 6 shows a 64-bit concatenation of a new word value in a Zth source register, shown as Z0 (where Z equals one of A, B or C), and an old word in a Zth shadow register, shown as Z1. When shift control is applied, the co-processor is configured to read a windowed portion of data from a combination of the corresponding source and shadow registers, where the set of control registers indicate shift parameters to control a location of the windowed portion of data. In the example of FIG. 6, the control register CRBL_z_CSRL sets a number of bits by which the start of register Z0 is shifted right. This right shift sets a 32-bit start of a window that is applied to the 64-bit concatenation. This may also be seen as shifting the value in the source register Z0 left by CRBL_z_CSRL bits and then filling the vacated values with bit values shifted in from Z1. The result is then read as the value of the source register in place of Z0, i.e. forms the w-bit input to the function (F). There may be three shift control registers CRBL_z_CSRL, e.g. one for each source of the example of FIG. 4. In one case, if the source is provided in the matrix form of FIG. 5A, then during "Y step" (e.g. once every CRBL_R_SIZX steps) the shadow registers (A1, B1, C1) may be zeroed to ensure bit values do not leak from one row to the next. If the CRBL_z_CSRL register is set to zero, then the raw value Z0 is used directly, i.e. as described in other examples. If the shift value s is an integer value from 1 to (w−1), the source register Z0 is shifted left by s bits while "s" highest-order bits from Z1 are shifted in (e.g. equivalent to (z0<<s)|z1>>(32−s) in C).

By applying shift control in the above example, the cryptographic co-processor may apply a custom shift whenever it loads raw source words (A0, B0, C0) from memory, by storing their previous values (A1, B1, C1) and then reading a shifted combination of the two. The control registers define how the current word and the previous word are combined to produce the source word that is used in the function applied by the arithmetic engine.

Figure 7:
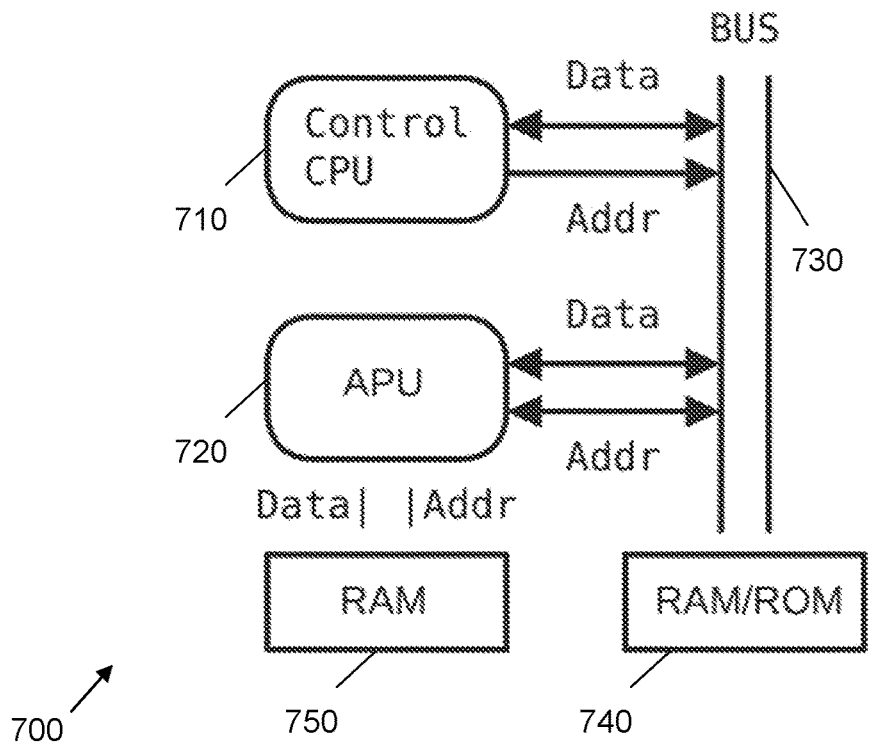
FIG. 7 is a schematic illustration showing how a main processing unit and an auxiliary processing unit may access data over a systems bus according to an example.

FIG. 7 shows an example architecture 700 where the cryptographic co-processor has its own internal memory and is communicatively coupled to a systems bus. FIG. 7 may be seen as a schematic variation of the architecture shown in FIG. 3.

The example 700 shows a control CPU 710 and an auxiliary processing unit—APU-720. The auxiliary processing unit 720 may be a cryptographic co-processor as described in previous examples. The control CPU 710 may be a main or general-purpose CPU for the architecture 700. In FIG. 7, the control CPU 710 and the APU 720 are communicatively coupled via a systems bus 730. This systems bus 730 may also be used by main RAM, Flash ROM, and other peripherals. FIG. 7 shows memory 740, made up of a combination of RAM and ROM, which may be accessed via the systems bus 730. At least the control CPU 710 may access this memory 740, e.g. by specifying a memory address and then by reading and writing data at that address, In certain examples, the APU 720 may access the memory 740; but it is generally preferred that the APU 750 use its own internal RAM 750. This RAM 750 may be accessed by the APU 720 in the same way that the control CPU 710 accesses the memory 750.

In FIG. 7, the control CPU 710 controls the APU 720 by writing to a set of memory-mapped control registers, e.g. as described in previous examples. Memory and control registers may be accessed as a memory mapped resource (e.g.

using Direct Memory Access—DMA) or via a Memory Management Unit (MMU). The control CPU 710 is also able to access the special-purpose RAM 750 assigned to the APU 720. Once started by the control CPU 710, the APU 720 independently works on its data without interaction with the control CPU 710. The control CPU 710 may perform other operations and access memory 740 while the APU 720 works on its data. Since the APU 720 has its own dedicated RAM interface, the processing performed by the APU 720 does not disrupt or slow down the control CPU 710 and the main systems bus 730.

As the example cryptographic co-processors described herein may operate as a memory-mapped peripheral, they may be configured to operate with most CPUs and Instruction Set Architectures (ISAs). In certain cases, it may be desired to more tightly couple the design with a specific CPU, which may be possible. For example, if the CPU is based on a RISC architecture (e.g. RISC-V), then the control registers of the cryptographic co-processors may be mapped to CSRs (Control and Status Registers) of the CPU.

When using its own dedicated memory, the example cryptographic co-processors described herein are able to use all memory access exclusively for the task in hand, e.g. essentially saturating the memory bandwidth of the internal memory. This may not be possible if the cryptographic processor were to access memory such as 740 that is shared with a CPU such as 710. In a typical two- or four-step cycle, the cryptographic co-processor is able to load three source words and write a single result word (e.g. two steps for dual port RAM or four steps for single port RAM). No additional cycles are required for instruction load and interpretation, performing arithmetic, incrementing memory pointers, and checking for loop end condition. Those functions are automatically performed in hardware. This means binary operations may be performed at speed.

The cryptographic co-processor may not have its own program code per se, for example, since features such as conditional branching may be missing. This means that the cryptographic co-processor may not be Turing complete and so needs to work closely with the CPU. An efficient use of the cryptographic co-processor involves the coupled CPU preparing the next operation for the co-processor (e.g. by loading the control registers) while the co-processor is still completing its previous task. Once started, the co-processor is able to perform a block operation on data stored in RAM. If this RAM is accessed via the same bus that is used by the main CPU, e.g. is RAM 740, then the co-processor could slow down the CPU's access to the entire bus while it is operating. This drawback may be avoided by using a dedicated secondary bus and internal RAM 750 as shown in FIG. 7. With this architecture, it may also be easier to secure access to the RAM 750.

In one test implementation, the internal RAM 750 comprised 16 kB of working memory. The internal RAM 750 was memory mapped and a base address offset was defined to indicate a starting address within the address space of the control CPU 710. For example, a base address offset—CRBL_BASE_ADDR—may be set to, say, 11000000 (in hexadecimal), wherein 16 kB of memory extends to address 11003FFF (in hexadecimal) The control registers may be memory mapped to an address space in a similar manner A control address offset—CRBL_CTRL_ADDR—may be defined to indicate a starting address of the control registers in the address space of the control CPU 710. The control registers may each be w bits in length (e.g., one word). The control register address space may be before or after the internal memory address space. In the example above, if the control register address space immediately follows the address space assigned to the internal RAM 750, then the control address offset may be set as 11004000 (i.e. the next address after 11003FFF). In one example there may comprise twenty or more control registers. An example set of 32-bit control registers with number and hexadecimal offset from CRBL_CTRL_ADDR are shown in FIG. 8. Some of these control registers have been discussed in the examples above. They include: a function specifier or identifier—CRBL_R_OPER; a status readout—CRBL_R_STAT; dimensions for the multi-dimensional array—CRBL_R_SIZX and CRBL_R_SIZY (e.g. as shown in FIG. 5A); for each of the available sources and the destination, a start address—CRBL_z_ADDR—and increments for each of the dimensions—CRBL_z_INCX and CRBL_z_INCY; and for the source registers, a shift control parameter CRBL_z_CSRL (as described with reference to FIG. 6)—in this case z is one of A, B, C or D as shown. The set of control registers defined in FIG. 8 are provided as an example only and may change in actual implementations, e.g. the number of sources may vary, different dimensions may be defined for each source and destination, and/or different shifts may be implemented. There may also be a level of abstraction applied, e.g. an intermediate array structure may be defined such that one or more of the internal memory and the control registers may be accessed using a word index i instead of a raw memory address and/or set of offsets. For example, the control CPU 710 may be provided with a programming language interface (e.g. a C Application Programming Interface—API) that allows access to the control registers using a crbl_c[n] array (where n is the register number) and/or access to the internal memory using another crbl[i] array (where i is a word index). If the control CPU 710 uses byte-addressing, then if the APU 720 uses 32-bit words, a control CPU address of CRBL_BASE_ADDR+4*i may be seen by the APU 720 as word address i (as 32-bits equals 4 bytes of 8 bits).

In one case, the internal RAM 750 may comprise a dual-port type memory that allows two access operations per clock cycle of the APU 720. This may thus allow four memory addresses to be read in two clock cycles. In this case, there may be three source registers and one destination (i.e. A, B, C and D), as the data for these registers may be fetched from memory in two clock cycles. The clock cycles of the APU 720 may be at the same frequency as the control CPU 710 or may differ depending on implementation. Dual port RAM is generally more expensive than the single port RAM that is typically used for RAM in the system memory 740, but may be accommodated cheaply in the proposed embodiments as only a small amount of memory is required to perform the functions of the arithmetic engine. In general, the address generator may be configured to determine addresses within an internal dual port memory and the plurality of source registers may comprise three internal source registers to allow fast reads from memory.

The examples of FIG. 3 and FIG. 7 show a general case where a cryptographic system on chip comprises a systems bus, a central processing unit coupled to the systems bus, a systems memory coupled to the systems bus that is used by the central processing unit, and a cryptographic co-processor. The cryptographic co-processor may be configured as described in any of the previous examples (including as described for the APU 720), and certain features from one example may be used in combination with one or more features of another example without requiring all the features of those examples to be provided.

Figures 9, 10:
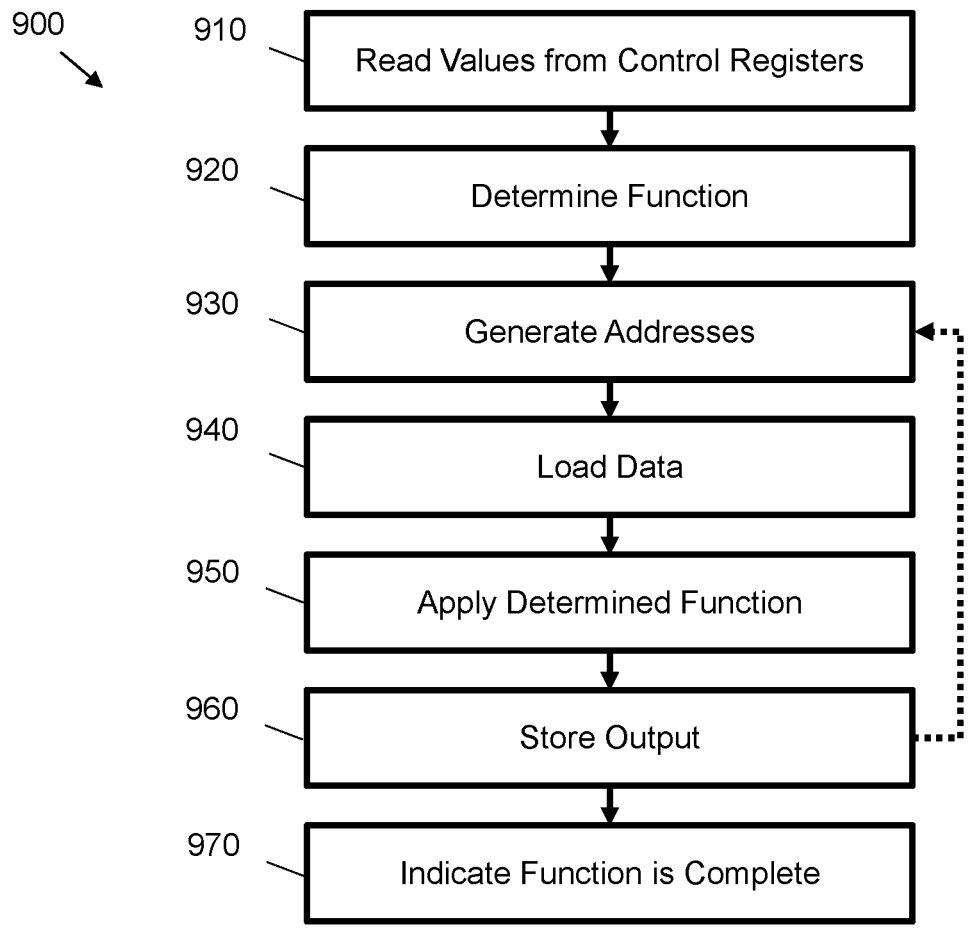
FIG. 9 is a flow diagram showing a method of performing a cryptographic operation according to an example.
FIG. 10 is a table for use with an example Boolean operation.

FIG. 9 shows a method 900 of performing a cryptographic operation. This method may be applied with any of the previously described co-processor examples, or with another suitably configured co-processor. A co-processor may also be referred to as an auxiliary processing unit. In certain cases, the method 900 may be programmed into programmable circuitry, e.g. using HDL or microcode or a low-level programming language. The programmable circuitry may comprise a ROM, an FPGA or a programmable ASIC. In certain cases, an ASCI or the like may be configured to perform the blocks of the method 900. Using dedicated programmed circuitry, e.g. rather than a general-purpose processing unit, reduces costs and speeds up operations.

The method 900 comprises a first block 910 that involves reading values from a set of control registers. These may comprise the control registers 115 or 315 in FIG. 1 or 3. The values in the set of control registers are written as instructed by a main processing unit that is communicatively coupled to the co-processor. For example, CPU 350 or control CPU 710 may write values to an address in their address space that is memory mapped to the control registers of the co-processor. The control registers may be similar to those shown in FIG. 8, and values may comprise signed or unsigned integer values that are stored as a word of w bits. For example, the size parameters CRBL_R_SIZX and CRBL_R_SIZY may comprise unsigned (i.e. positive) integers, whereas the increment parameters CRBL_z_INCX and CRBL_z_INCY may comprise signed integers (i.e. allowing for both positive and negative integer values).

At block 920, a function is determined that is used by the cryptographic operation. For example, for a lattice or code-based cryptographic operation, the function may comprise one or more of Boolean logic and integer arithmetic (e.g. multiplication, addition and subtraction). The function may be selected from a set of different available functions based on at least one value in the set of control registers, e.g. a positive w-bit integer stored within the function specifier control register CRBL_R_OPER. The function is not a high-level cryptographic operation such as encryption or decryption, or a symmetric key operation, rather, the function is a mathematical base function that is used within these cryptographic operations (e.g. often repeatedly). As such the function may correspond to a one-line statement in a higher-level programming language or pseudo-code for the cryptographic operation. For example, the function may involve the multiplication of integer values stored as one or more sequences of bits within each word in the memory used by the co-processor, or addition/subtraction of those sequences that are implemented as binary arithmetic computations. The function may be described as a discrete function as it operates on binary sequences or integers defined by those binary sequences, as opposed to non-integer representations that are used to approximate continuous computations.

At block 930, a set of addresses associated with a respective set of sources and at least one destination are generated. The sources represent an input to the function. The destination represents an output for the function. The sources and destination may have corresponding registers within the cryptographic co-processor (e.g. as internal registers or cache for an executed computation). These corresponding registers may alternatively form part of the internal memory of the co-processor. The addresses that are generated correspond to one or more of an internal memory of the co-processor and a systems memory used by the main processing unit—e.g. one of memories 335 or 355 of FIG. 3 or 740 or 750 of FIG. 7. As discussed herein, an internal memory of the co-processor is preferred. The addresses are accessible to the main processing unit, e.g. they may form part of the address space of the main processing unit. In one case, the internal memory may comprise a memory mapped resource of the main processing unit. It should also be noted that although block 930 is shown prior to block 940, this is only required for the sources; the determination of the destination address may be performed in parallel with, or after blocks 940 and/or 950, so long as it is available for the storage of the resulting data at block 960.

At block 940, data is loaded from the generated addresses associated with the set of sources. There may be one or more sources. This data is to be used as input to the function. This may comprise a fetch operation, where the addresses are used to retrieve word-length sequences of bits from memory and to store these in a set of (temporary) source registers where data is retrieved to perform the function. At block 950, the function is performed. This may comprise applying bit manipulation to the bit sequences stored in the source registers, i.e. the bit sequences read from memory at block 940. The function may be implemented by enacting a set of programmed logic within an FPGA or ASIC. The function may take one or more clock cycles of the co-processor. An output of the function comprises a sequence of bits, e.g. of word length or having w-bits, which may be stored in a (temporary) destination register. Block 950 may comprise the operations shown in FIG. 4 and/or FIG. 5B.

At block 960, an output of the function is stored at a generated address associated with the destination. For example, this may comprise transferring the value that is stored in the destination register into one or more of the internal memory or the systems memory, where the location in one of these memories is determined by the generated address.

At block 970, an indication is provided to the main processing unit that the output is available at the generated address associated with the destination. This may comprise a passive indication, e.g. a status readout control register such as CRBL_R_STAT in FIG. 8 may be set to a predefined value to indicate that the operation is complete (e.g. this may be set to a zero value in the example of FIG. 8 to indicate the co-processor is no longer busy). In other examples, an active indication may be provided, such as an interrupt for the main processing unit.

In one case, the indication at block 970 is only provided after a set of iterations are complete. The set of iterations may comprise zero or more iterations (e.g. no repetitions of blocks 930 to 960, or one or more iterations of these blocks as indicated by the dashed arrow of FIG. 9). The number of iterations in the set may be defined using values in the control registers.

In one case, the method 900 (in particular blocks 930 to 960) is repeated to apply the function to a multi-dimensional array of data associated with each of the plurality of sources. This is shown in the examples of FIGS. 5A and 5B. In this case, a multi-dimensional array of data associated with the destination may be stored at a plurality of generated addresses associated with the destination, e.g. where a different portion of the array is stored after each iteration. As explained with respect to FIGS. 5A and 5B, a custom or programmable path within one or more of the plurality of multi-dimensional arrays may be configured via the address generation at block 930. For example, the addresses that are generated at block 930 may be determined based on a start address (such as CRBL_z_ADDR in FIG. 8, where z={A, B, C, D}) and increment values for one or more dimensions (such as CRBL_z_INCd in FIG. 8, where z={A, B, C, D} and d={X, Y}). Hence, the complete operation of the co-processor or "blit" may be performed with respect to a plurality of sources each defined as a multi-dimensional array and provide an output in the form of another multi-dimensional array, whose values are stored in a memory accessible to the main processing unit. The indication at block 970 may be provided when the complete array for the destination is ready for reading.

In certain examples, the operation of the co-processor may be considered as a pipelined process similar to a normal CPU. In these examples, certain operations may be performed in parallel and/or optimised to speed up operation of the co-processor. For example: at a first step in the pipeline addresses are generated for the sources and/or destination; at a second step in the pipeline, data words are fetched from the source addresses and optionally shifted (e.g. as per FIG. 6); at a third step a function may be performed, e.g. as $D=f_i(A, B, C)$ or $(D, \text{carry})=f_i(A, B, C, \text{carry})$—the latter explained in more detail below; and at a fourth step D is written to the destination address. If there is only one source A, then the fourth steps may be performed simultaneously, e.g. with the next value of A being loaded as the previous value is used in the function. If there are three sources A/B/C and dual port memory is used, the four steps may be performed over two cycles. When the pipeline is optimised and steps are performed in parallel, addresses for a $(t-3)^{th}$ iteration may be generated at the first step, data words for a $(t-2)^{th}$ iteration fetched at the second step, the function is carried out on values for a $(t-1)^{th}$ iteration and values of D for the $t^{th}$ iteration stored at the fourth step. Dual port memory allows two addresses to be read or written to in one cycle, so (A, B) may be read in one cycle and C read and D written in another cycle.

In general, the method 900 may be seen as one "blit" of the cryptographic co-processor, where each "blit" runs through the area of a multi-dimensional array (e.g. via the loop shown in dashed lines in FIG. 9). If the multi-dimensional array is a two-dimensional array such as shown in FIG. 5A, there may be CRBL_R_SIZX*CRBL_R_SIZY (i.e. width*height) iterations. Once the area has been worked, a new operation, e.g. a new run-through of the method 900, may be scheduled. If the operation is a big integer multiplication, the multi-dimensional arrays for the sources may represent the big integers to be multiplied, e.g. the width and height may respectively indicate the lengths of two numbers to be multiplied. In cases, where one or more of the width and height are one, then this operation may represent a column or row vector operation.

The method 900 and the variations above may be performed by the co-processor. On the side of the main processing unit (or CPU), the method may comprise a series of blocks prior to block 910 in FIG. 9. At a first block performed by a main processing unit, a cryptographic operation to be performed may be determined. This may comprise an instruction to run a known cryptographic algorithm, such as NTRU, Round5, Saber, XMSS, BIKE, Dilithium, or Kyber. The known cryptographic algorithm may comprise a post-quantum algorithm, i.e. a cryptographic algorithm that provides protection against attack by a quantum computer. In general, the cryptographic algorithm may comprise one or more of: lattice-based cryptographic algorithms; code-based cryptographic algorithms; elliptic curve cryptographic algorithm; and isogeny-based cryptographic algorithms.

At a second block, the main processing unit may decompose the cryptographic operation into one or more functions. For example, this may comprise executing compiled and/or machine-code that indicates a function and/or may comprise executing computer program code that has been adapted to use function calls to the co-processor. For example, a cryptographic algorithm that encrypts, decrypts or generates a key may have multiple sub-operations that involve common base Boolean or integer arithmetic functions. These functions may then be identified and assigned to the co-processor. In certain cases, the cryptographic co-processor is simply controlled just using writes to the set of control registers, e.g. a specific "GO" register is written to and this initiates a co-processor operation (or "blit"). This may be performed using any form of computer program code, including assembly languages and low-level coding languages such as C or Rust. The cryptographic co-processor need not be synchronised with the main processing unit, it may simply perform an operation and indicate when a result is available. When a result is available and the co-processor is no longer busy, a new operation may be initiated by writing to the control registers again. Generally, use of the cryptographic co-processor requires low to minimal changes to the program flow of the higher-level cryptographic algorithm.

Within this method, the main processing unit may repeat a series of sub-blocks for each identified function to be performed within the cryptographic algorithm. A first sub-block may comprise loading, as instructed by the main processing unit, values into the set of control registers for the co-processor. These are the values that may later be read at block 910 of method 900. A second sub-block may comprise loading, as instructed by the main processing unit, data into one or more of the internal memory of the co-processor and the systems memory used by the main processing unit. For example, the main processing unit may store data at the identified start addresses that has an extent equivalent to the size of any defined multi-dimensional array. The main processing unit may load data directly into an internal memory of the co-processor, e.g. by accessing it as a memory mapped resource and/or the co-processor may be arranged to retrieve data (e.g. either for use directly or to copy into its own internal memory) from the memory used by the main processing unit. For example, in the case of FIG. 3 or FIG. 7, the co-processor may directly access external memory (e.g. 355 or 740) to copy chunks into internal memory (e.g. 335 or 750). At a third sub-block, the main processing unit is configured to initiate the co-processor by loading a start value into the set of control registers. This may comprise a Boolean start flag or may comprise writing a non-zero function identifier to a function specifier control register (e.g. CRBL_R_OPER in FIG. 8).

Following the sub-blocks described above, the method 900 may be performed. During this time the main processing unit may wait for an indication that output is available at the generated address associated with the destination. This may comprise waiting for the indication described with reference to block 970, e.g. waiting for a change in a control register value or an interrupt. The main processing unit is able to perform other operations during said waiting. For example, this may enable different portions of a cryptographic algorithm to be effective parallelised.

In the example implementation of FIG. 8, writing to the CRBL_R_OPER register may start a co-processor operation, e.g. initiate method 900, and may also define the function (e.g. F in FIGS. 4 and 5B) being performed on the plurality of sources (e.g. A, B and C in FIGS. 4 and 5B). In FIG. 8, the w-bit function control word CRBL_R_OPER specifies what type of logic is used to combine the source input words (e.g. A, B, C) to produce the output word D. The architecture is flexible, and a varying set of functions may be supported, depending on the configuration. Writing to the CRBL_R_OPER register may be performed after ensuring that appropriate control values have been written to the set of control registers. In one case, the internal variables used by the co-processor that are indicted by the control register values are only loaded at a start of a co-processor operation (a "blit"), so changing them while the co-processor is executing has no effect on its operation. This allows a sequence of co-processor operations (e.g. "blits", where each "blit" may comprise the method 900) to be executed in rapid succession. For example, an operation for a second function may be prepared as the co-processor is executing a first function. In certain cases, a co-processor method call may be defined (e.g. as a C API call) to avoid needing to write to the CRBL_R_OPER register directly. A similar co-processor method call may be defined for a waiting operation, where the method call will block until all running co-processor operations are finished, e.g. either by polling the CRBL_R_STAT status register or by waiting for an interrupt. Both co-processor method calls are calls that are executed by the main processing unit.

The functions that are applied by the arithmetic engine as described in examples herein may comprise sub-functions for one or more of code-based and lattice-based cryptography, e.g. for the algorithms as described above. The functions may implement Boolean logic operations, e.g. treating the source values as bit sequences that may be combined using Boolean logic operations. The functions may also implement integer arithmetic operations, e.g. one or more of integer multiplication, integer subtraction, and integer addition, where integer values are defined by sequences of bits stored at defined word addresses.

In certain examples, the cryptographic co-processor described in the examples herein may be configured to evaluate a plurality of functions and to store respective outputs in a respective plurality of destination addresses. For example, the cryptographic co-processor may comprise a plurality of arithmetic engines and/or an arithmetic engine that is able to evaluate multiple functions at one time. In one case, the plurality of functions may be evaluated in parallel and outputs stored in corresponding destination addresses. The functions that are evaluated at the same time may comprise different functions. They may be set based on a common function set. Functions may be selectable via respective function identifiers in the set of control registers. In one case, each function may operate on the same set of sources but generated a different destination result. In this case, the control logic of the cryptographic co-processor may be configured to select one of the destinations. This selection may be performed conditionally, e.g. based on the values stored in the destinations. In another similar variation, there may be multiple cryptographic co-processors that share a common memory, e.g. similar to internal memory 335 in FIG. 3.

FIG. 10 shows how a truth table may be defined for an example Boolean logic operation. As described above this may be set using a value stored in the CRBL_R_OPER register of FIG. 8. For example, when 32-bit words are used and the value of CRBL_R_OPER is of the form 000000xx (i.e. high 24 bits are zero), then the 8-bit value xx may define a truth table for an arbitrary 3-input Boolean function, where the Boolean function is applied to the bits of the sources (e.g. A, B and C). As such each of these low 8 bits defines how an output for a destination (D) is to be generated for given combination of input bits (e.g. as indicated by words A, B, C).

For example, if the 8-bits are taken as a set of 1-bit variables "hgfedcba", where the most significant bit ("h") is the "oper bit 7" in FIG. 10 and the least significant bit ("a") is the "oper bit 0" in FIG. 10. Then setting the value of each of the 1-bit variables indicates an output of the different 1-bit combinations shown in last three rows of the table of FIG. 10. For example, the bit value "a" indicates the result (e.g. 0 or 1) of combining three 0 bits in each of the sources, the bit value "d" indicates the result of combining 0 in the A source and 1 in the B and C sources, and the bit value "h" indicates the result of combining three 1 bits in each of the sources. Hence, each of the different 8-bit sequences define a different truth table. As an example, if one bit from each of the sources (A, B, C) equals (1, 0, 1) then the function identifier 0xCC (in hex) means that the sequence "hgfedcba" equals 11001100, and so "oper bit 5" ("f") equals 0 and the output of the combination (i.e. D) is 0. Comparatively, if the function identifier is 0x80 (in hex) then this means that the sequence "hgfedcba" equals 1000000, i.e. a logical AND operation on all three sources. The bit comparisons may be performed in parallel for each bit in the sequences in the sources, e.g. if the registers are 32-bit then 32 bit comparisons are performed in parallel. If there are n sources, then the truth table is indicated with $2^n$ bits within the function identifier. Hence, the cryptographic co-processor is able to implement a plurality of custom binary logic operations.

Certain values of the function specifier may be assigned constants, e.g. a mask operation that fills the destination with ones may have a function specifier value of 000000FF may be defined as a C constant (CRBL_OP_MASK) for programs for the main processing unit. The constant CRBL_OP_MASK can be used to guarantee that the high bits are zero. All zeros (i.e. 00000000) may be a function that just ignores the inputs and writes zeroes to the destination. A value of 000000F0 (e.g. set as a constant CRBL_OP_ASRC) may just copy a value stored in a source register A to the destination D, and CRBL_R_OPER being set to~CRBL_OP_ASRC & CRBL_OP_MASK (i.e. the value and the aforementioned mask) may result in the logical inverse of same source register being written to the destination D. Different combinations of defined constants may be used to indicate different Boolean operations. For example, if CRBL_OP_BSRC is set as 0x000000CC (which copies a value in source register B to the destination D) and CRBL_OP_CSRC is set as 0x000000AA (which copies a value in source register C to the destination D), then an expression such as (CRBL_OP_ASRC & CRBL_OP_BSRC)^CRBL_OP_CSRC will evaluate to 0x6A, and will lead to the Boolean operation of (A AND B) XOR C. Boolean operations may be useful for a variety of tasks. They may be especially useful for (bitsliced) implementations of symmetric cryptographic algorithms.

Another example of functions that may form part of the set of functions are so-called "row operation" primitives. Row operation primitives allow the co-processor to rapidly add and subtract integer vectors from each other. Different functions may interpret the bit sequences stored in a set of input source registers (e.g. A, B and C) in different ways. One function may compute D=A+B−C, wherein the source registers A, B, C are interpreted as packed arrays of four 8-bit integers. Another function may compute the same series of addition and subtractions, i.e. D=A+B−C, but interpret source registers A, B, C as packed arrays of two 16-bit integers. For example, if w=32 and an 8-bit operation is used, there are effectively four parallel, independent 8-bit arithmetic operations being performed, e.g. the second byte of the destination D depends on the second bytes of the sources A, B, C, where any result may be interpreted as modulo 256.

In certain examples the function applied by the arithmetic engine is stateless. However, to allow long integer arithmetic (e.g. where long means that over or underflow occurs), an additional "carry" register may be used by the arithmetic engine to store a carry for the arithmetic. This may be indicated as (D, carry)=$f_i$(A, B, C, carry). For example, a function may be defined that has the same sum D=A+B−C, but where the source registers are interpreted as full length w-bit integers. In this case, an additional carry variable may need to be set, which may be accessible from the carry register. The carry register may also store negative values indicating a "borrow". The carry register may be reset at the beginning of each row when iterating over a multi-dimensional array (e.g. when performing a step in the Y dimension). Each of these row operation primitives may have a different function specifier (i.e. identifier) value. The carry may not be available for direct reading by the external processing unit. In one implementation, the carry register may be cleared at the start of each operation (e.g. each performance of the method 900) and/or at the end of each row (e.g. when making a Y increment as previously described).

Another function may be an integer multiplication. Like the row operation primitives, integer multiplication may be performed with different interpretations of the source register bit sequences using different function specifier values. A multiplication function on three sources (A, B and C) may comprise a combinatory function D=A+B*C. In one case, arbitrary-length integers (e.g. large) may be multiplied in a single operation of the co-processor (e.g. a single run of the method 900). This may use a carry. In certain integer multiplications, a 2w-bit product may be computed, and this may be split between w-bits in a destination register and w-bits in a carry register. An equivalent description of an arbitrary-length multiplication function, combinatory function D=A+B*C, in the C programming language may be:

```
carry+=((uint64_t)a_data)+((uint64_t)b_data)*
    ((uint64_t)c_data);

d_data=(uint32_t)carry;

carry>>=32;
```

An example of how the above large integer multiplication may be configured will now be described. This example also shows how a co-processor may be configured to use a multi-dimensional array. A little-endian big-integer representation is assumed (but other representations may be configured via the function definition). In this case, an integer of "m−1" words defined as source B is multiplied by an integer of n words defined as source C. Source B is defined starting from CRBL_B_ADDR with an additional high word set to zero (i.e. is actually a bit sequence of m words) and source C is defined starting from CRBL_C_ADDR. First, a destination array of (n+m−1) words is cleared and both source A (e.g. as defined via CRBL_A_ADDR) and destination D (e.g. as defined via CRBL_D_ADDR) are configured to point to it. The full product B*C is then able to computed with a single operation of the co-processor (e.g. one iteration of the method 900). The configuration may be prepared using the following C code:

crbl_c[CRBL_A_INCX]=1; //A: (X) Advance by 1.
crbl_c[CRBL_A_INCY]=2−m; //A: (Y) Rewind back, advance by one.
crbl_c[CRBL_A_CSRL]=0;
crbl_c[CRBL_B_INCX]=1; //B: (X) Advance by 1.
crbl_c[CRBL_B_INCY]=1−m; //B: (Y) Rewind all the way back.
crbl_c[CRBL_B_CSRL]=0;
crbl_c[CRBL_C_INCX]=0; //C: (X) Same value entire row.
crbl_c[CRBL_C_INCY]=1; //C: (Y) advance by 1
crbl_c[CRBL_C_CSRL]=0;
crbl_c[CRBL_D_INCX]=1; //D: (X) Same as A, advance by 1.
crbl_c[CRBL_D_INCY]=2−m; //D: (Y) Rewind back, advance by one.
crbl_c[CRBL_R_SIZX]=m; //Width (B size+1 zero word).
crbl_c[CRBL_R_SIZY]=h; //Height (C size).
crbl_go(CRBL_OP_M32A); //Start the multiplication operation.
crbl_wait( ); //(Wait for it to finish.)

In the above operation, the destination is first set to 0 and the source register A is used to read back intermediate values before a final product is ready. As a (hypothetical) example using decimal values, imagine that it is needed to multiple the values 123*456 and the word size is a single decimal digit. In this case, B=123 and C=456. In a first set of iterations: A=0, B*C=3*6=18, D=8, carry out=1; A=0, B*C=2*6=12+1=13, D=3, carry out=1; and A=0: B*C=1*6=6+1=7: D=0, carry out=0. These iterations represent a first row and D=00738. Now, for a second set of iterations that represent a second row, A=D and A and B are rewound. For the second set of iterations, A, C and D are stepped and effectively A, D are stepped through the middle 3 digits. The second set of iterations thus proceed as: A=3, B*C=3*5=15+3=18, D=8, carry out=1; A=7, B*C=2*5=10+7+1=18, D=8, carry out=1; and A=0, B*C=1*5=5+1=6, D=6, carry out=0. The second row is now complete and D=06888. For a third set of iterations, the high 3 digits of A and D are stepped through: A=8, B*C=3*4=12+8=10, D=0, carry out=1; A=6, B*C=2*4=8+6+1=16, D=6, carry out=1; and A=0, B*C=1*4=4+1=5, D=4, carry out=0. After this row, D=56088=123*456, the end result that is output after a single operation or "blit". Of course, in reality, the integers are represented as binary rather than decimal integers, but the steps are similar.

Certain examples described herein provide methods and systems that assist a main processing unit with a cryptographic operation. The methods and systems allow cryptographic operations to be carried out with smaller processor overhead, and with less complexity. Power consumption may also be reduced as fewer cycles of main processing unit operation are required and the co-processor may be implemented as a low power FPGA or ASIC. This offers benefits that may not be possible with comparative vector or Single Instruction, Multiple Data (SIMD) processors. For example, SIMD is primarily implemented as a feature of the main or external processing unit, rather than involving a separate co-processor, and the cryptographic co-processor may not have machine instructions or "instruction flow" as SIMD architectures do. Also, in architectures that support access of SIMD registers, the vectors or arrays are treated as part of the register file of the CPU; this means that the amount of data that can be stored without loading and storing to main (i.e. external) memory is severely limited as access to the systems bus and main memory is via the main or external processing unit.

The co-processor is adapted to perform a variety of common cryptographic base functions, e.g. arithmetic, such as addition or subtraction of words, or complex bit manipulation operations consisting of shifts, indirect addressing, and evaluation of a multi-input Boolean functions. These common cryptographic base functions may be designed to support one or more known post-quantum cryptographic algorithms. The co-processor may be used to help implement post-quantum (i.e. quantum-resistant) cryptography on a large range of devices, from servers to smart cards. The co-processor is specifically designed to speed up cryptographic operations, such as large-scale linear algebra and big-integer arithmetic. This differs from comparative floating-point co-processors that are designed to operate with bit sequences that define exponents and significands but that are unsuitable for performing common cryptographic base functions. The base design of the co-processor, incorporating aspects described in the present examples, may be flexibly configured to face the implementation challenges of different types of cryptographic algorithms, including to help quickly support future-developed algorithms (which may use the same base functions but in different orders and combinations). The set of functions that may be performed by the co-processor may be configured depending on the needs of the target system, e.g. if a smart card only needs to implement one cryptographic algorithm that only requires row operation primitives then other functions may not be needed and a smaller size co-processor may be provided.

Certain examples described herein provide a cryptographic architecture, and methods of operating such an architecture, that efficiently interface a specialised cryptographic processing unit with a larger processing unit. Certain examples described herein provide cryptographic methods that may be suitable for implementation on low-resource microcontrollers and embedded devices, as well as for implementation for high-speed secure data processing. The described cryptographic architecture is agnostic to the type of processing unit that is used, with options for different control procedures being available through a set of control registers. The cryptographic architecture may be implemented using memory mapping and/or other approaches, thus providing easy or transparent data access to different types of processing unit. Certain examples described herein may be used to enable efficient hardware and/or software implementations of higher-level cryptographic algorithms that use smaller, base cryptographic functions as "building blocks". The cryptographic co-processor may perform rapid cryptographic base functions on behalf of a processor or microprocessor, and as such provides benefits for both low-power embedded devices and high-throughput server devices.

Although certain examples refer to accessing data within a certain register, and reading and/or writing data from such a register, it will be understood that in practice intermediary data storage and/or data structures may be used in certain implementations, and that reference to "data in" may also apply to "data derived from", e.g. data that results from one or more intermediate processes in additional to those described. Reference to a set of registers may indicate a reference to one or more registers. Examples that feature a main, external or central processing unit may also feature multiple such units, of the same or different types. For example, a computing system in which the cryptographic co-processor is implement may comprise a heterogeneous system with multiple CPUs of different types, e.g. where the CPUs share a common systems bus. Furthermore, even though the "control" of the co-processor has been described with respect to an external processing unit, other devices such as disk drives and network interfaces may perform a DMA (Direct Memory Access) transfer to accessible co-processor memory areas. It shown also be understood that reference to circuitry coupled to certain components may be alternatively implemented as functionality within that component, e.g. whether via executed firmware code and/or dedicated hardware circuity. "Circuitry" as described herein may be implemented in hardware, e.g. using digital logic gates or programmable gates of an FPGA, and/or as computer program code that is loaded from memory and executed by a processor, such as a microprocessor. Certain system components and methods described herein may be implemented by way of computer program code, such as firmware or an instruction set, that is storable on a non-transitory storage medium, such as a read-only updatable firmware memory.

The above examples are to be understood as illustrative. Further examples are envisaged. For example, specific values discussed herein are based on test examples and may vary depending on implementation (e.g. depending on microcontroller specifications and type, on security requirements and other factors). Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A co-processor for cryptographic operations, the co-processor being communicatively coupled to an external processing unit, the co-processor comprising:
   a set of control registers writable by the external processing unit;
   an arithmetic engine to perform a function upon binary data stored within a set of source registers and to store an output of the function in at least one destination register, the function being applied to a respective set of bit sequences stored within the set of source registers that are representative of integer values, the function being selected from a function set comprising one or more of Boolean logic and integer arithmetic;
   an address generator to determine a set of source addresses that are used to load binary data from memory into the set of source registers and at least one destination address that is used to store binary data from the at least one destination register in memory; and
   control logic to control the operation of the arithmetic engine and the address generator based on values stored in the set of control registers, wherein the control logic is configured to select the function from the function set based on at least one value in the set of control registers.

2. The co-processor of claim 1, wherein at least the set of control registers are accessible by the external processing unit as a memory mapped resource.

3. The co-processor of claim 1, comprising:
an internal memory accessible to the external processing unit,
wherein the set of source addresses and the at least one destination address comprise addresses within the internal memory, and
wherein the internal memory is accessible by the external processing unit as a memory mapped resource.

4. The co-processor of claim 1, comprising:
an external memory interface to communicatively couple the co-processor to an external memory, the external memory being a memory for the external processing unit,
wherein the set of source addresses and the at least one destination address comprise addresses within the external memory.

5. The co-processor of claim 1,
wherein the control logic applies the arithmetic engine and the address generator over a set of iterations to perform an operation on binary data associated with a plurality of sources and to output binary data associated with a destination,
wherein, over the set of iterations, the address generator determines a set of source addresses associated with a matrix of data for each source and a set of destination addresses associated with a matrix of data for the destination, and
wherein, over the set of iterations, the arithmetic unit is applied to the matrices of data for the plurality of sources to output the matrix of data for a destination.

6. The co-processor of claim 5, wherein the address generator determines source and destination addresses that represent a programmable path within the respective matrices of data based on values stored within the set of control registers.

7. The co-processor of claim 6, wherein the values stored within the set of control registers indicate:
start addresses for the plurality of sources; and
positive or negative increments in each of the two dimensions of the matrices of data, said increments being applied for an iteration of the arithmetic engine.

8. The co-processor of claim 1, wherein address generator is configured to determine addresses within an internal dual port memory and the set of source registers comprise three internal source registers.

9. The co-processor of claim 1, comprising:
a set of shadow registers corresponding to the set of source registers,
wherein, responsive to an instruction to copy data from the set of source addresses to respective ones of the set of source registers, the co-processor is configured to store previous values within the set of source registers in the set of shadow registers.

10. The co-processor of claim 9, wherein, for a given source, the co-processor is configured to read a windowed portion of data from a combination of the corresponding source and shadow registers, and wherein the set of control registers indicate shift parameters to control a location of the windowed portion of data.

11. The co-processor of claim 1, wherein integer arithmetic comprises one or more of integer multiplication, integer subtraction, and integer addition.

12. The co-processor of claim 1, wherein the function set comprises sub-functions for one or more of code-based and lattice-based cryptography.

13. The co-processor of claim 1, wherein the co-processor is initiated via the at least one processing unit writing a function identifier to the set of control registers, the function identifier being used to select the function from the set of functions.

14. The co-processor of claim 1, wherein the co-processor is configured to evaluate a plurality of functions and to store respective outputs in a respective plurality of destination addresses.

15. A cryptographic system on chip comprising:
a systems bus;
a central processing unit coupled to the systems bus;
a systems memory coupled to the systems bus that is used by the central processing unit; and
a co-processor comprising:
a set of control registers writable by the central processing unit;
an internal memory;
a set of internal cryptographic registers comprising a set of source registers and at least one destination register;
an arithmetic engine to perform a function upon binary data stored within the set of internal cryptographic registers, the function being applied to a respective set of bit sequences stored within the set of source registers that are representative of integer values, the function being selected from a function set comprising one or more of Boolean logic and integer arithmetic;
an address generator to determine a set of source addresses that are used to load binary data from one or more of the internal memory and the systems memory into the set of source registers and at least one destination address that is used to store binary data from the at least one destination register in one or more of the internal memory and the systems memory; and
control logic to control the operation of the arithmetic engine and the address generator based on values stored in the set of control registers by the central processing unit, wherein the control logic is configured to select the function from the function set based on at least one value in the set of control registers.

16. The cryptographic system on chip of claim 15, wherein the set of control registers and the internal memory of the co-processor are mapped to a secure address space of the central processing unit.

17. The cryptographic system on chip of claim 15, wherein the co-processor is secured within the cryptographic system on chip using one or more of security fuses and side-channel attack countermeasures.

18. A method of performing a cryptographic operation comprising:
reading, by an auxiliary processing unit, values from a set of control registers for the auxiliary processing unit, the values being written as instructed by a main processing unit that is communicatively coupled to the auxiliary processing unit;
determining a function used by the cryptographic operation to be performed by the auxiliary processing unit, the function being selected from a function set comprising one or more of Boolean logic and integer arithmetic based on at least one value in the set of control registers;
generating a set of addresses associated with a respective set of sources and at least one destination, the addresses corresponding to one or more of an internal memory of the auxiliary processing unit and a systems memory used by the main processing unit, the addresses being accessible to the main processing unit;

loading data from generated addresses associated with the set of sources;

applying the determined function to the data;

storing an output of the function at a generated address associated with the at least one destination; and indicating to the main processing unit that the output is available at the generated address associated with the destination.

19. The method of claim 18, wherein at least a portion of the method is repeated to apply the function to a multi-dimensional array of data associated with each of a plurality of sources that form the set of sources, wherein a multi-dimensional array of data associated with the destination is stored at a plurality of generated addresses associated with the destination, and wherein a custom path within one or more of the plurality of multi-dimensional arrays is configured using a start address and increment values for one or more dimensions that are stored in the set of control registers.

20. The method of claim 18, comprising, prior to the step of reading:

determining a cryptographic operation to be performed by the main processing unit;

decomposing the cryptographic operation into one or more functions;

for a function within the one or more functions:

loading, as instructed by the main processing unit, values into a set of control registers for the auxiliary processing unit;

loading, as instructed by the main processing unit, data into one or more of the internal memory of the auxiliary processing unit and the systems memory used by the main processing unit;

initiating the auxiliary processing unit by loading a start value into the set of control registers; and waiting for an indication that output is available at the destination, wherein the main processing unit is able to perform other operations during said waiting.

* * * * *